(12) United States Patent
Gil et al.

(10) Patent No.: US 6,922,749 B1
(45) Date of Patent: Jul. 26, 2005

(54) APPARATUS AND METHODOLOGY FOR AN INPUT PORT OF A SWITCH THAT SUPPORTS CUT-THROUGH OPERATION WITHIN THE SWITCH

(75) Inventors: Mercedes Gil, Fort Collins, CO (US); Richard L. Schober, Cupertino, CA (US); Ian Colloff, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 625 days.

(21) Appl. No.: 09/977,515

(22) Filed: Oct. 12, 2001

(51) Int. Cl.$^7$ .............................................. G06F 13/00
(52) U.S. Cl. ..................... 710/316; 710/317; 710/309; 710/38; 710/113
(58) Field of Search ................................ 710/305–317, 710/240–241, 113–125, 36–42, 31–33, 8–19, 51–57

(56) References Cited

U.S. PATENT DOCUMENTS

| | | | |
|---|---|---|---|
| 5,615,161 A | | 3/1997 | Mu |
| 5,644,604 A | | 7/1997 | Larson |
| 5,740,346 A | | 4/1998 | Wicki et al. |
| 5,768,300 A | | 6/1998 | Sastry et al. |
| 5,838,684 A | | 11/1998 | Wicki et al. |
| 5,892,766 A | | 4/1999 | Wicki et al. |
| 5,931,967 A | | 8/1999 | Shimizu et al. |
| 5,959,995 A | | 9/1999 | Wicki et al. |
| 5,987,629 A | | 11/1999 | Sastry et al. |
| 5,991,296 A | | 11/1999 | Mu et al. |
| 6,003,064 A | | 12/1999 | Wicki et al. |
| 6,081,848 A | * | 6/2000 | Grun et al. ..................... 710/1 |
| 6,170,030 B1 | * | 1/2001 | Bell .......................... 710/310 |
| 6,243,787 B1 | * | 6/2001 | Kagan et al. ............... 710/263 |
| 6,480,500 B1 | * | 11/2002 | Erimli et al. ................ 370/412 |
| 6,557,060 B1 | * | 4/2003 | Haren .......................... 710/65 |
| 6,594,329 B1 | * | 7/2003 | Susnow ....................... 375/372 |
| 6,594,712 B1 | * | 7/2003 | Pettey et al. ................ 710/22 |
| 6,694,392 B1 | * | 2/2004 | Haren .......................... 710/65 |

OTHER PUBLICATIONS

InfiniBand Architecture Specification, General Specification, Oct. 24, 2000, pp. 880, vol. 1.
"InfiniBand Switch Chip Runs at 10 Gbps On Eight Ports", Nicholas Cravotta, Nov. 8, 2001, EDN, 1 page.
"Assemble Fast Switch Fabrics With 32–Port InfiniBand Node p. 60", Electronic Design, Oct. 15, 2001, 4 pages.
"RedSwitch, Inc. Announces Industry's Highest Performance and Highest Integration InfiniBand Switch Chip", RedSwitch Press Release, Oct. 16, 2001, 2 pages.
"RedSwitch Gearing Up To Launch New Chip", Steve Tanner, Silicon Valley Business Ink, Oct. 26, 2001, 3 pages.
"Mellanox Integrates Serdes Into Infiniband Switch", Jerry Ascierto, EE Times, Oct. 23, 2001, 3 pages.

(Continued)

*Primary Examiner*—Paul R. Myers
*Assistant Examiner*—Raymond N Phan

(57) ABSTRACT

An input port is described having an input policing unit that checks if a virtual lane has a sufficient number of credits to carry an input packet received by the input policing unit. The input port also has a request manager that generates a request for the packet to be switched by a switching core. The input port also has a packet Rx unit that stores the packet into a memory by writing blocks of data into the memory. The input port also has a packet Tx unit that receives a grant in response to the request and reads the packet from the memory in response to the grant by reading the blocks of data. The input port also has a pointer RAM manager that provides addresses for free blocks of data to said packet Rx unit and receives addresses of freed blocks of data from said packet Tx unit.

81 Claims, 12 Drawing Sheets

OTHER PUBLICATIONS

"Switch Chip Expands InfiniBand Integration", EEM File 3130, Tony Chance, 2 pages.

"RedSwitch Announces 16 Gbyte/s Throughout Switch Product for RapidIO Architecture", RedSwitch Press Release, Milpitas, Calif., May 15, 2001, Tony Chance, May 15, 2001, 2 pages.

"RedSwitch and Agilent Technologies Unveil 160–GB/s Throughout Switch Product for InfiniBand Architecture", RedSwitch Press Release, Intel Developer Forum Conference, San Jose, Calif., Feb. 27, 2001, Mark Alden–Agilent, Tony Chance–RedSwitch, 2 pages.

* cited by examiner

APPARATUS AND METHODOLOGY FOR AN INPUT PORT OF A SWITCH THAT SUPPORTS CUT-THROUGH OPERATION WITHIN THE SWITCH

FIELD OF INVENTION

The field of invention relates generally to networking; and, more specifically, to an apparatus and methodology for an Infiniband input port that supports cut-through operation.

BACKGROUND

Computing systems are typically viewed as a processing core that is coupled to a plurality of "Input/Output" (I/O) devices. The processing core is often viewed as the central intelligence function of the computing system, while the I/O devices are often viewed as a means for sending information to the processing core and/or receiving information from the processing core.

A good example is a large computing system such as a UNIX based server or workstation. The processing core of a large computing system is usually implemented as a plurality of general purpose processor chips and a system memory that together execute the system's software routines. The I/O devices of a server or workstation are often implemented as some sort of "plug in" device (peripheral or otherwise). Examples of I/O devices within a server environment tend to include a graphics display, a networking interface, a data storage device (e.g., disk array unit), etc.

Large computing systems have traditionally used a bus to communicatively couple most all of the I/O devices to the processing core. For example, if a server's software requires a file from a disk drive unit, the file is transported from the disk drive unit to the processing core over a bus. Because a bus is a passive group of wires that are physically coupled to a plurality of I/O devices (or a plurality of I/O device connectors), typically, a number of different I/O devices are designed to communicate with the processing core over the same bus.

As such, system congestion (wherein two or more different I/O devices are contending for the resources of the bus) is not an unlikely occurrence. For example, if a disk drive unit and networking interface share the same bus; and, if both have information to send to the processing core at approximately the same time; then, one of the I/O devices has to wait for the other before its communication can commence (e.g., the networking adapter card, before sending information to the processing core, has to wait until the disk drive unit has sent its information to the processing core).

In cases where the processing core is of lower performance, no real loss in computing system performance is observed. That is, in a sense, if the processing core is only capable of handling the information from the I/O devices "one at a time" (e.g., if the processing core in the above example does not posses the resources to process the networking adapter card's information even if it was received "in parallel" with the disk drive unit's information), then the computing system may be said to be "processing core constrained"; and, there is no real loss in system performance as a result of the inefficiencies associated with the communication of the I/O devices over a shared bus.

The trend, however, is that processing core performance of large computing systems is outpacing bus performance. Semiconductor manufacturing technology improvements (which provide faster and more functionally robust processor chips) as well as "multi-processor" processing core designs (e.g., wherein a plurality of processor chips are designed to work together as a cooperative processing whole) have resulted in high performance processing core implementations that can simultaneously handle the emissions from two or more I/O devices.

As such, true losses in computing system performance are being observed for those high performance systems having a bus design between the processing core and the I/O devices of the system. In order to combat this trend, various system design approaches that "work around" the use of a bus as the principle means of communication between the processing core and the I/O devices have been proposed. One of these, referred to as "Infiniband", embraces the use of a switching fabric between the processing core and the I/O devices. FIG. 1 shows an example of an Infiniband or other switching fabric based architecture.

The processing core of the computing system 100 shown in FIG. 1 may be viewed as the collection of hosts $101_1$ through $101_6$. Each of the hosts $101_1$ through $101_6$ has an associated processor $103_1$ through $103_6$ that may be assumed to have its own associated memory. Each of the hosts $101_1$ through $101_6$ are coupled to a switching fabric 104 via their own host channel adapter (HCA) $102_1$ through $102_6$. In a sense, each of the HCAs $102_1$ through $102_6$ act as a media access layer for their corresponding processor (e.g., by preparing and receiving packets that are sent/received to/from the switching fabric 104).

The I/O devices of the computing system are referred to as its "targets" $107_1$ through $107_6$. Each of the targets $107_1$ through $107_6$ has an associated I/O unit $108_1$ through $108_6$ (e.g., a gateway to another network, a file server, a disk array, etc.) and target channel adapter (TCA) $109_1$ through $109_6$. Similar to the HCAs $102_1$ through $102_6$, the TCAs $109_1$ through $109_6$ act as a media access layer for their corresponding I/O (e.g., by preparing and receiving packets that are sent/received to/from the switching fabric 104).

The I/O units $108_1$ through $108_6$ are communicatively coupled to the processors $103_1$ through $103_6$ through the switching fabric 104. A switching fabric 104 is a network of switching nodes such as switching nodes $105_1$ through $105_5$. Consistent with the use and purpose of a network, the switching nodes $105_1$ through $105_5$ are responsible for directing packets toward their appropriate destination. For example, if I/O unit $108_6$ desires to send information to processor unit $103_1$, one or more packets that contain the information are directed over the switching fabric 104 from network access link $106_{12}$ to network access link $106_1$.

As such, switching node $105_5$ will direct these packets (upon their reception from access link $106_{12}$) toward switching node $105_2$ (e.g., by directing them to switching node $105_1$ which subsequently directs them to switching node $105_2$). A number of sophisticated computer architecture approaches are possible through the use of the switching fabric 104. These include (among possible others): 1) the implementation of a multi-processor computing system (because the switching fabric 104 allows the processors $103_1$ through $103_6$ to efficiently communicate with one another); 2) intelligent 110 units (because the switching fabric 104 allows the I/O units $108_1$ through $108_6$ to efficiently communicate with one another); 2) scalability (i.e., if an increase in processing performance is desired, more processors can be coupled to the network; if I/O needs to be expanded, more I/O units can be added to the fabric, with the fabric being expanded to meet the increased connectivity, and/or, if faster communication is desired through the network 104, more switches can be added to the network 104); and 3) partitioning (wherein a subset of processors are identified as being part of a unique multi-processing core resource that can operate privately).

The switching fabric 104 also provides a performance advantage over bus architectures because a large number of communications can be simultaneously carried between the various processors and I/O units. That is, a particular processor or I/O unit typically does not have to "wait" to send information until another unit has completed its own transmission of information. As a result, the various units are allowed to simultaneously inject their information into the network.

FIGURES

The present invention is illustrated by way of example, and not limitation, in the Figures of the accompanying drawings in which.

Figure 3:
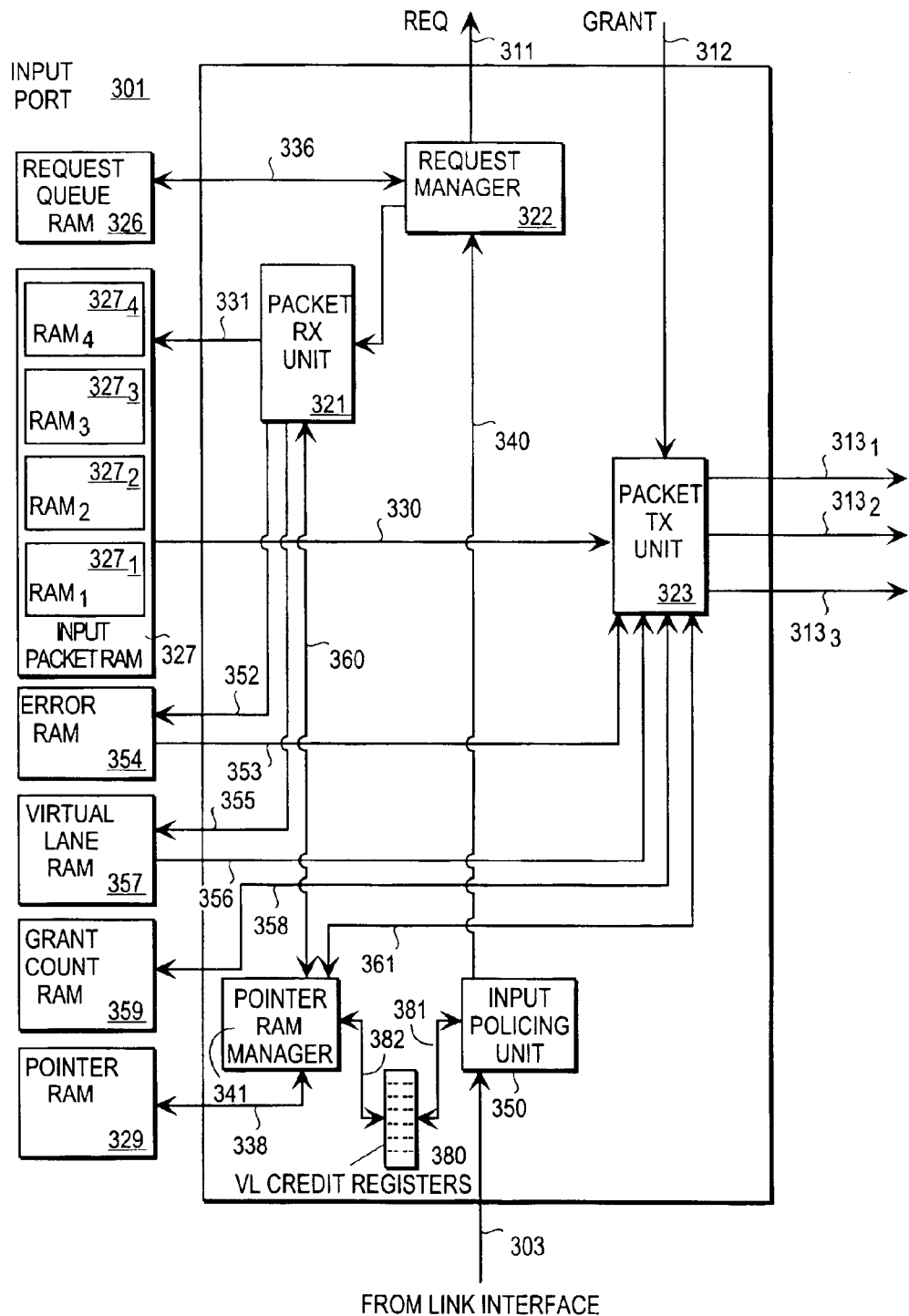
FIG. 3 shows an example of an input port that may be used within the switching node of FIG. 2.
Figure 4:
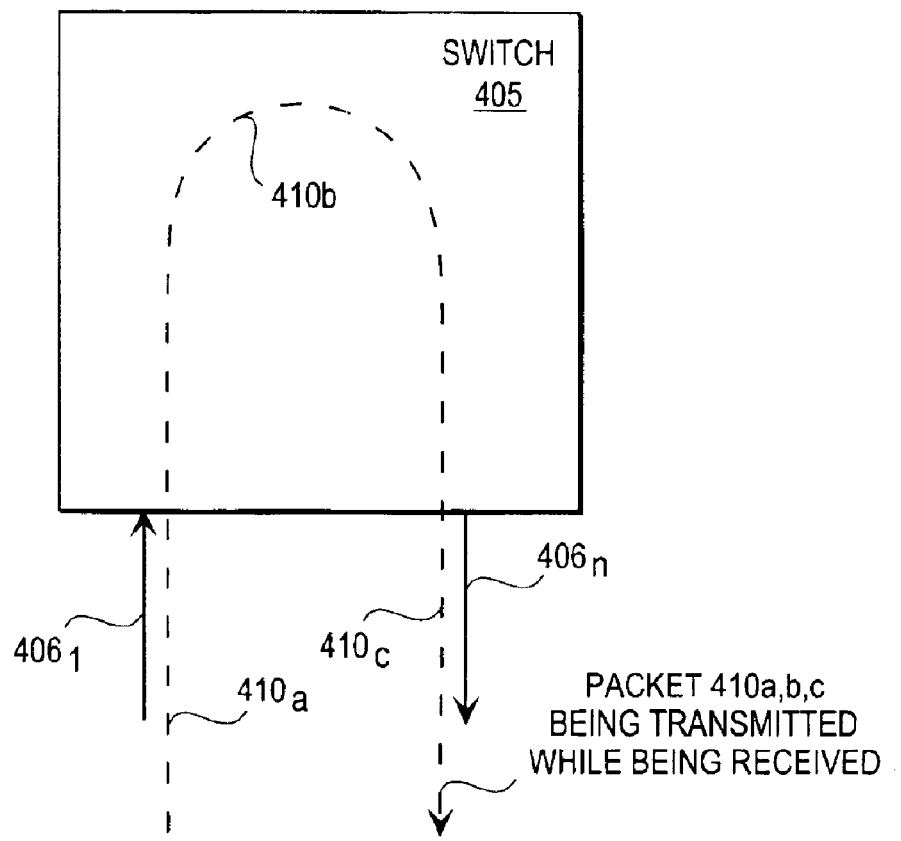
Figure 5:
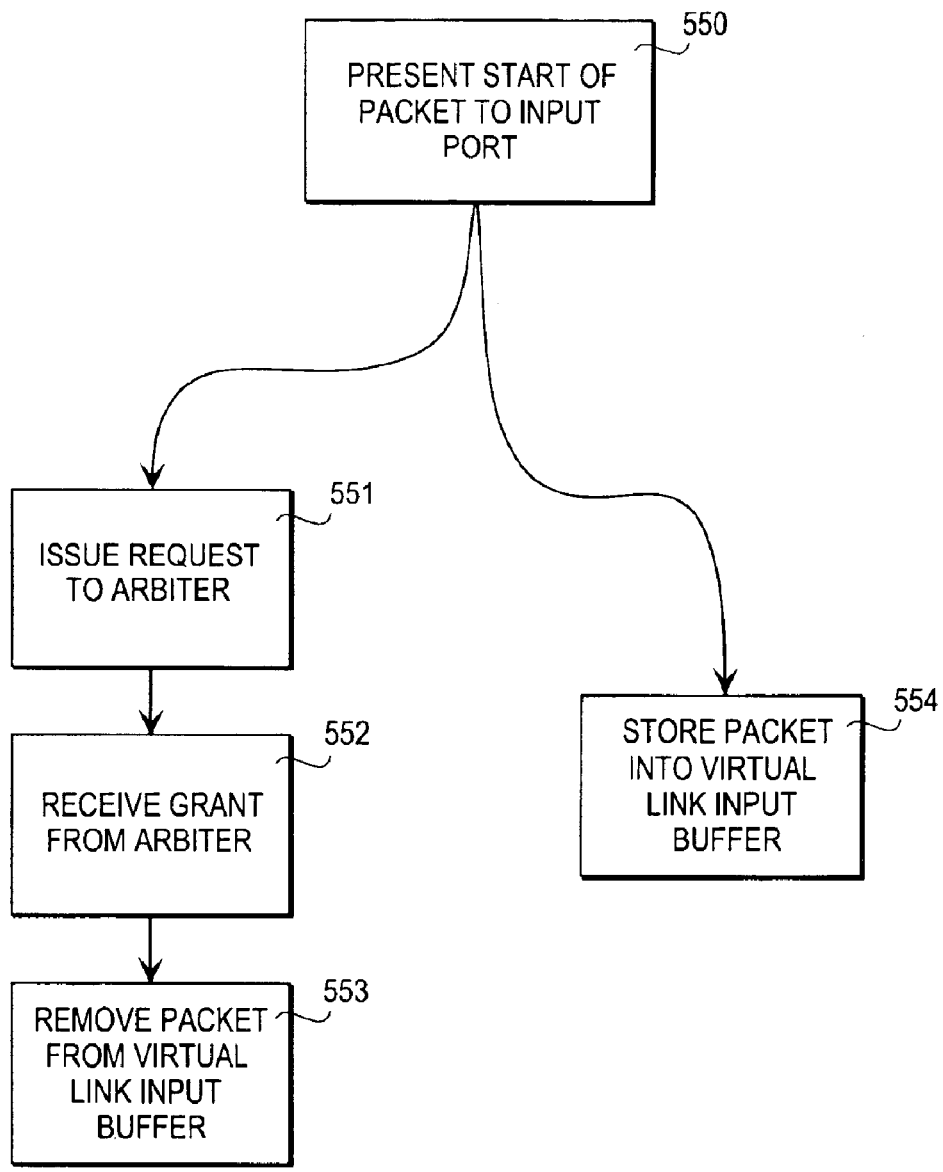
Figure 6:
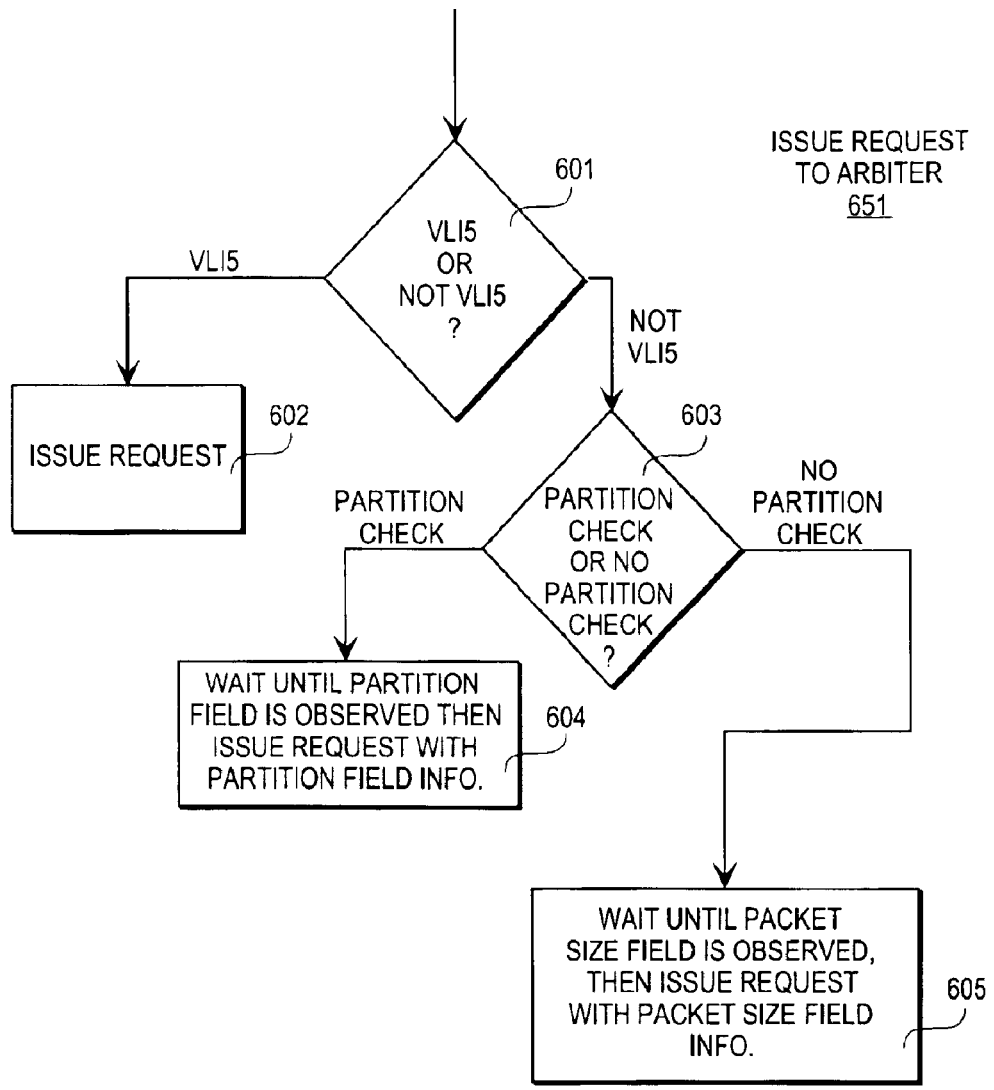

FIG. 4 shows an example of "cut-through" wherein an incoming packet that is being received is simultaneously being transmitted as an outgoing packet FIG. 5 shows an example of a methodology that can be executed by the input port of FIG. 3 to perform either "cut-through" operation or "store-and-forward" operation FIG. 6 shows an en embodiment of a methodology that may be executed by the request manager 322 of FIG. 3.

Figure 7:
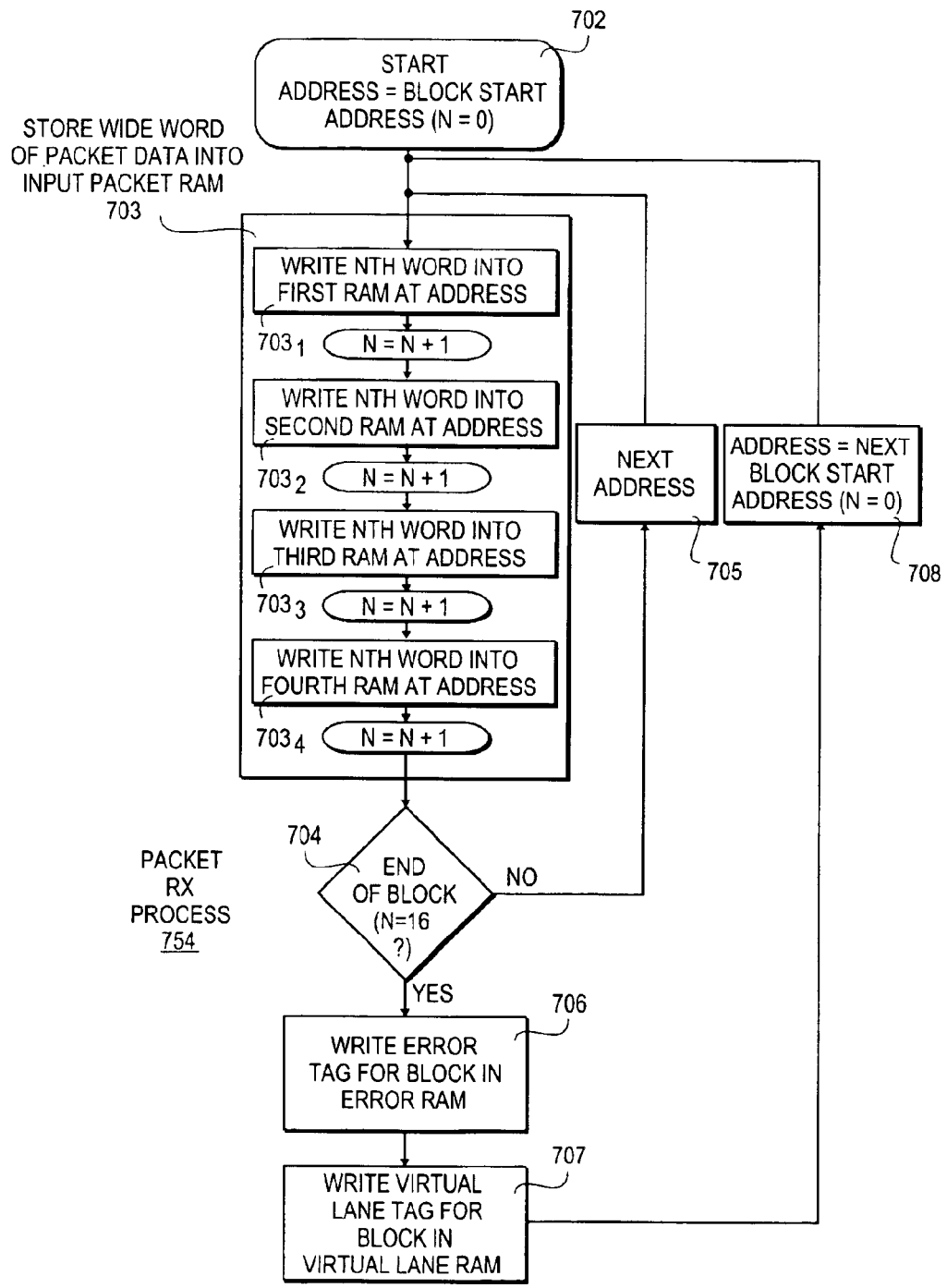
Figure 8:
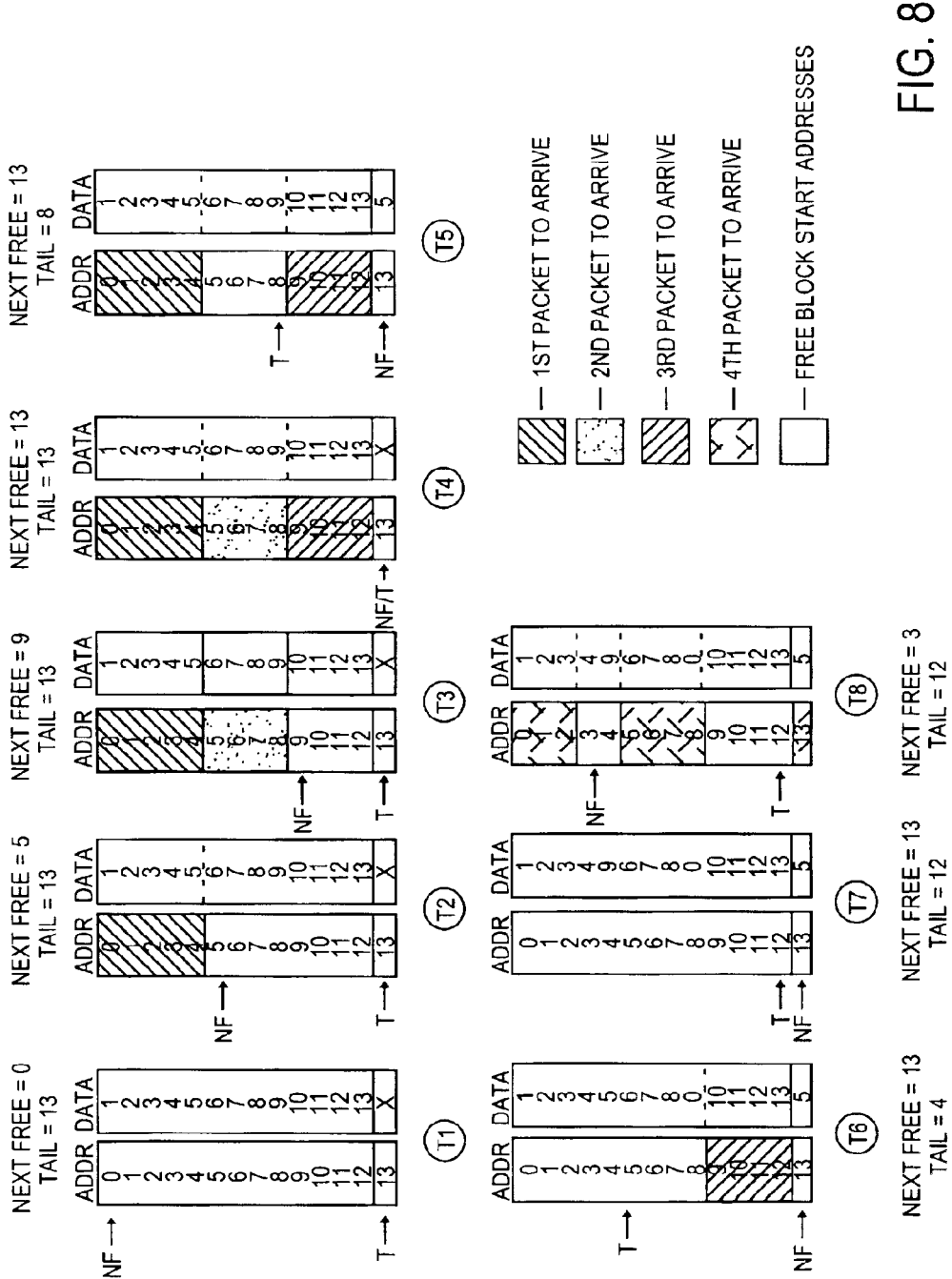

FIG. 7 shows an embodiment of a packet storing process that may be performed by the packet Rx unit 323 of FIG. 3;

FIG. 8 shows an example of a manner in which the pointer RAM 329 of FIG. 3 can be managed by the pointer RAM manager 341 of FIG. 3.

Figure 9A:
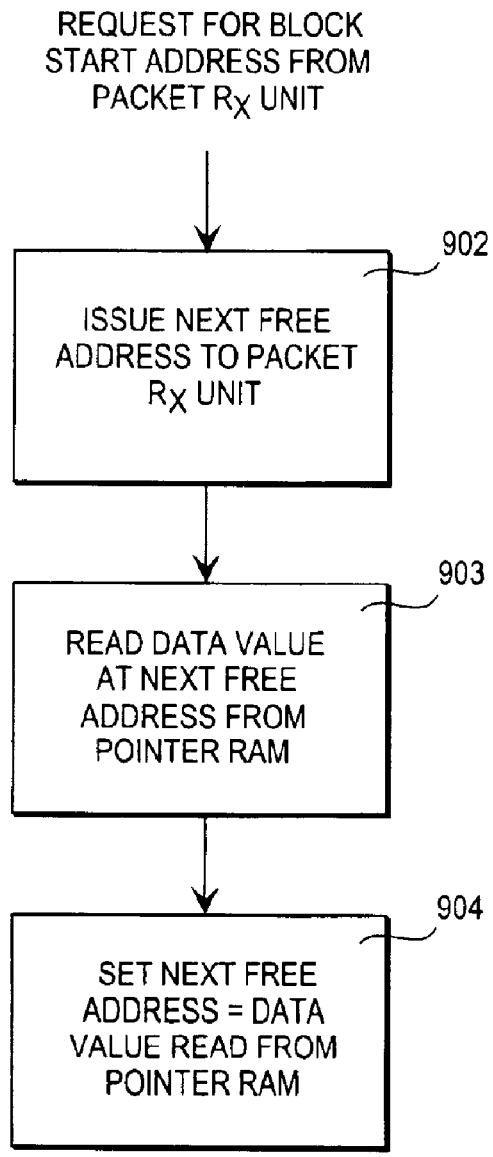
Figure 9B:
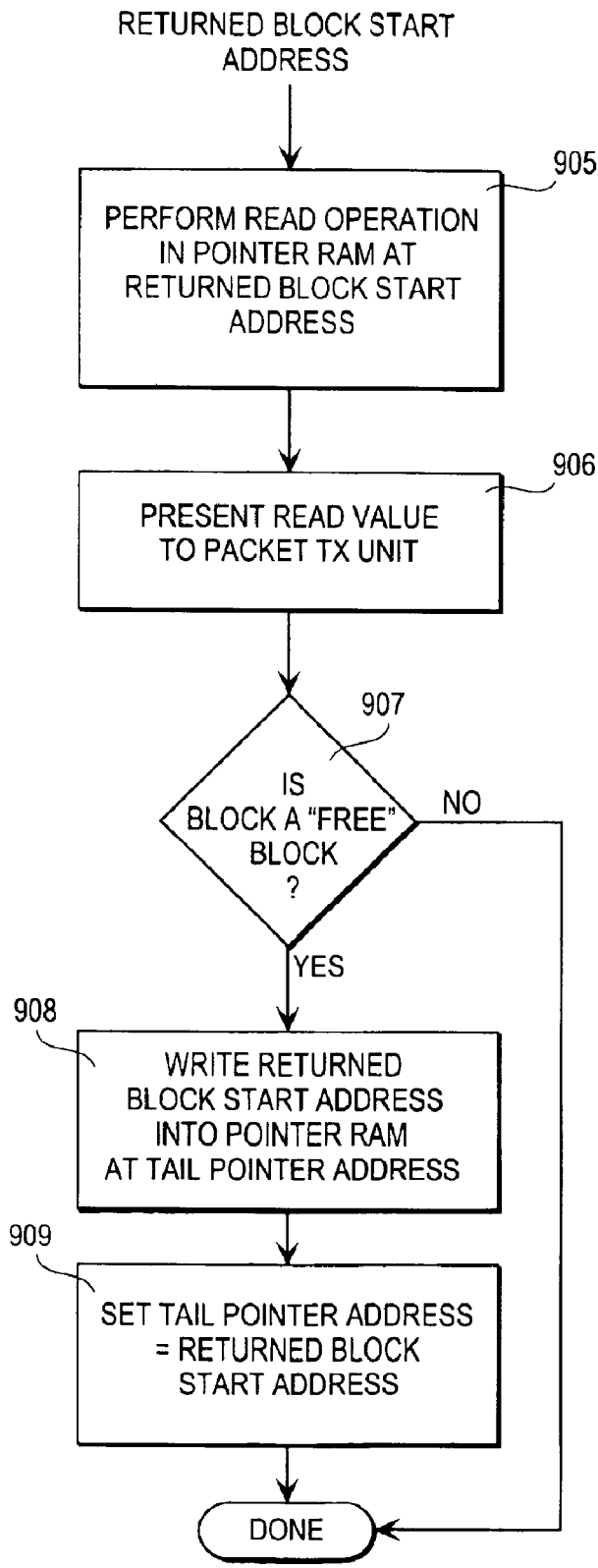
Figure 10:
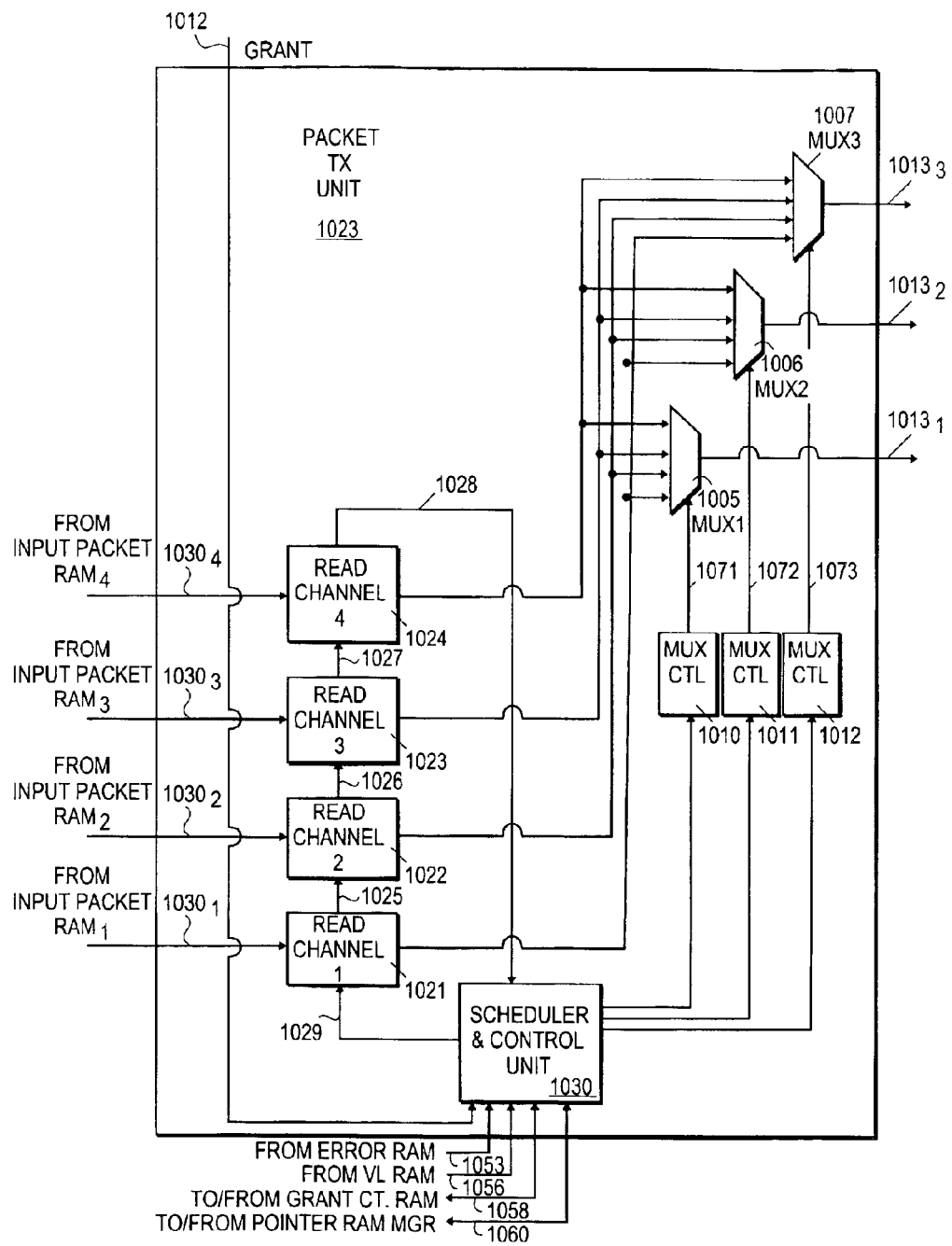
Figure 11:
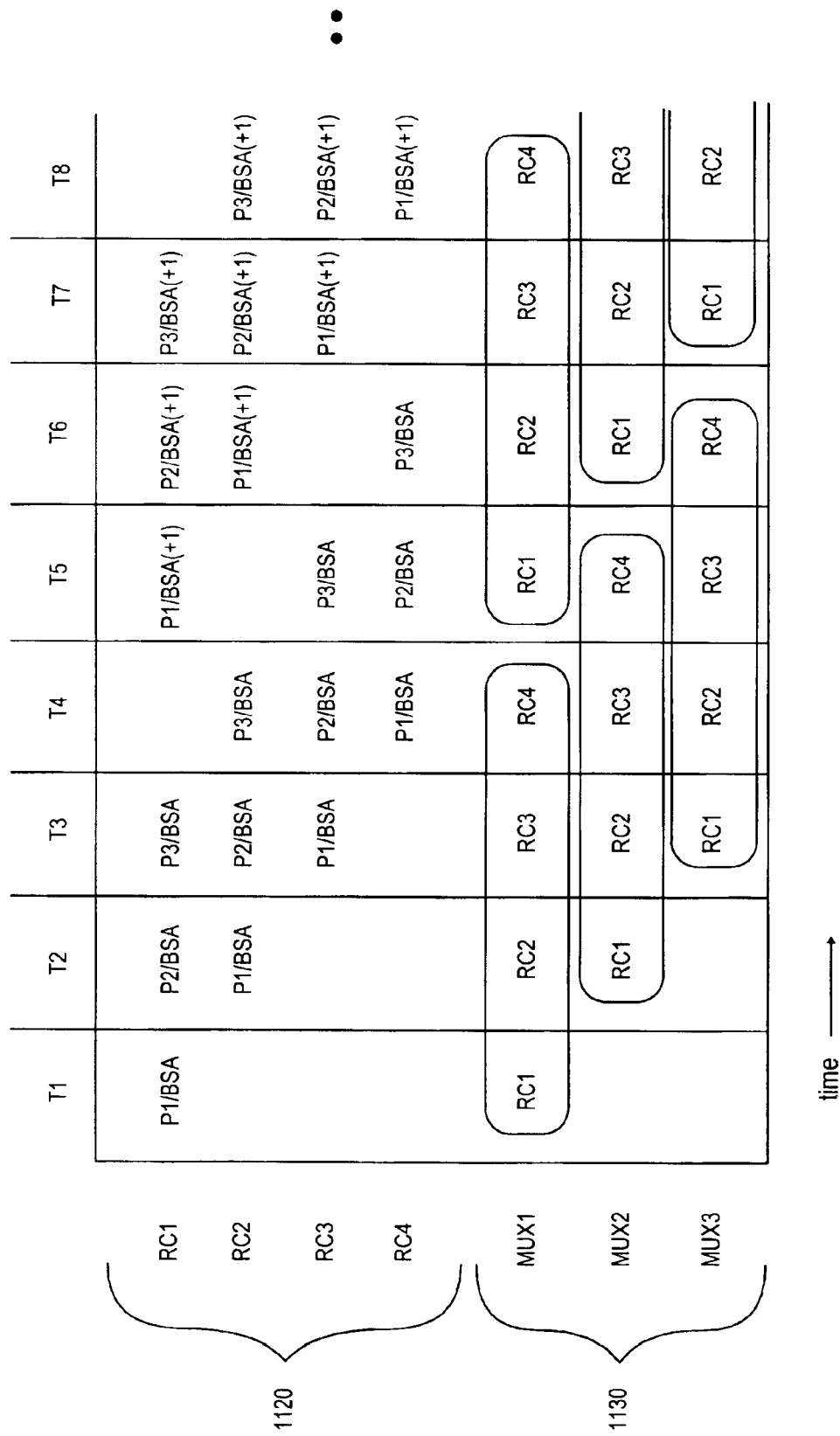

FIG. 9a shows a methodology that may be executed by the pointer manager 341 of FIG. 3 in order to implement the pointer RAM management observed in FIG. 8 for responding for a request for a new block start address;

FIG. 9b shows a methodology that may be executed by the pointer manager 341 of FIG. 3 in order to implement the pointer RAM management observed in FIG. 8 for responding to a returned block start address;

FIG. 10 shows an embodiment of a packet TX unit 1023 that may be used for the packet TX unit 323 of FIG. 3;

FIG. 11 shows scheduling technique for transmitted packets from the packet TX unit 1023 of FIG. 11;

DESCRIPTION

Overview of Infiniband Switch Embodiment

Figure 1:
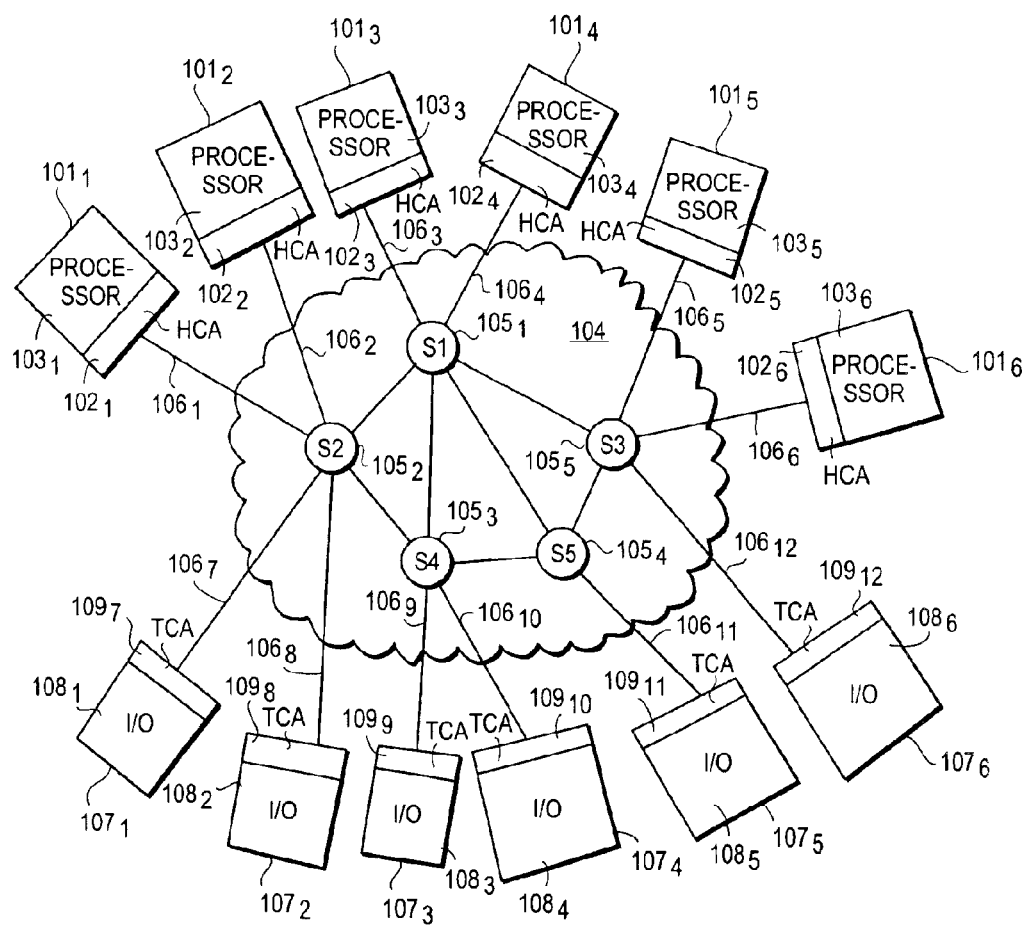
FIG. 1 shows an example of an Infiniband network.
Figure 2:
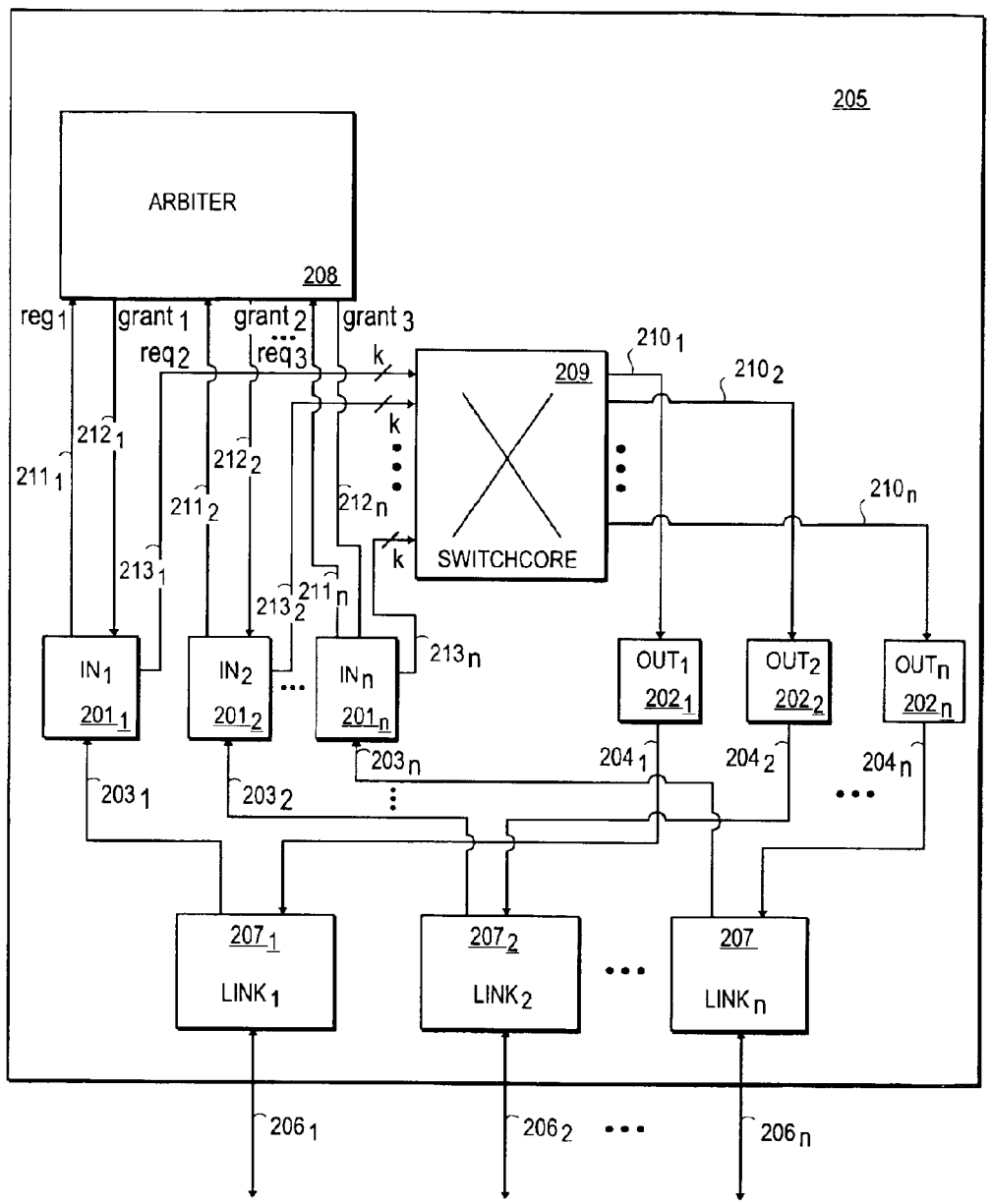
FIG. 2 shows an example of a switching node that may be used within an Infiniband network.

FIG. 2 shows an embodiment of a design 205 for a switching node. That is, switching node 205 may be viewed as an "in-depth" perspective of any of the switching nodes $105_1$ through $105_5$ shown in FIG. 1. According to the switch design of FIG. 2, a plurality of links $206_1$ through $206_n$ are coupled to the switch 205. A link is a networking line that propagates information from switch to switch within the network (or acts as an access link that allows devices outside the network to send/receive information to/from the network). Examples include copper or fiber optic cabling.

In the Infiniband scheme, typically, links are characterized as having a "4×" speed or a "1×" speed. Currently, a 1× speed link has as a 2.5 Gbps link rate (2 Gbps data rate) and is implemented as a single link that is operated at this speed. A 4× speed link is currently implemented as four 1× speed links that are operating in parallel with one another. As such, the total speed of the 4× link is a 10 Gbps link rate (8 Gbps data rate). It is important to note, however, that as the Infiniband standard evolves, other link speeds and topologies are possible. As seen in FIG. 2, each link $206_1$ through $206_n$ has an associated link interface $207_1$ through $207_n$.

A link interface is responsible for launching packets onto a link a receiving packets from a link. Thus, for example, link interface $207_1$ launches packets onto link $206_1$ and receives packets from link $206_1$. Each link interfaces $207_1$ through $207_n$ also has an associated input port (that accepts incoming packets) and output port (that provides output packets). That is, for example, link interface $207_1$ sends incoming packets that have arrived from link $206_1$ to input port $201_1$; and, output port $202_1$ provides outgoing packets to link interface $207_1$ for transmission over link $206_1$. Alternate embodiments may deviate from the 1:1:1 link:link interface:port ratio just described above.

The general traffic flow for an incoming packet is to flow firstly from its link interface to its input port. Then, the packet flows from its input port to a switching core 209 (which can be constructed with a crossbar switching architecture as suggested by FIG. 2). The switching core 209 switches the incoming packet from its input port to its appropriate output port; and, in so doing, effectively converts the incoming packet to an outgoing packet. For example, if an incoming packet from link $206_1$ is to be emitted as an outgoing packet on link $206_n$, the switching core 209 will "switch" the packet from switching core input $213_1$ to switching core output $210_n$.

As such, the packet will be directed from input port $201_1$ to output port $202_n$ which effectively converts the packet from an input packet to an output packet. Note that in the switch design 205 of FIG. 2, each input port $201_1$ through $201_n$ has a plurality ("k") of output lines. In an embodiment, k=3. As such, each input port $201_1$ through $201_n$ is capable of simultaneously sending 3 different packets to the switching core 209; and, for a switch 205 where n=8, the switching core 209 corresponds to a 24×8 (input/output) crossbar switch.

The timing as to when an incoming packet is permitted to be switched by the switching core 209 is controlled by the arbiter 208. In an embodiment, for each incoming packet, a request data structure is issued by the corresponding input port to the arbiter 208. For example, if link interface $207_1$ sends a packet to input port $201_1$ input port $201_1$ issues a request data structure along request interface $211_1$ to the arbiter 208. As a request data structure is issued for each incoming packet, the arbiter 208 effectively collects these requests and is able to develop an understanding of the overall offered load being presented to switch 205.

Arbiter 208, which may be viewed as the central intelligence of the switch 205, "decides" when a particular request is to be favorably responded to. When such time arrives, a grant is directed from the arbiter 208 to the input port that issued the request. For example, for the aforementioned packet in which a request data structure was issued by input port $201_1$, the arbiter 208 will issue a grant along interface $212_1$ to input port $201_1$.

In an embodiment, each of the input ports $201_1$ through $201_n$ are configured to have some sort of queuing or blocking so that one or more incoming packets can "wait" until the arbiter 208 decides the time is appropriate for each of their individual releases to the switching core 209. The arbiter 208 typically has designed into its intelligence the ability to determine when a grant should be provided to each incoming packet (that has had a request data structure issued to the arbiter 208 by its input port) based upon a number of factors.

The factors may include: 1) whether or not sufficient bandwidth resources currently exist at the output port and output link to which each packet is directed; 2) whether or not sufficient bandwidth resources currently exist at the switching core 209 to handle the switching of a next packet; 2) the relative priority of each packet (e.g., as based upon the source/destination of each packet and/or the packet type of each packet). The arbiter 208, in various embodiments, can also be viewed as having functionality that determines the appropriate output port for each incoming packet (e.g., based upon the destination address embedded within each packet's header information).

As such, each request data structure that is issued from an input port may be embedded with (or otherwise include) various specific information about its corresponding incoming packet. For example, in one embodiment, each request includes: 1) the size of the packet; 2) information that characterizes the packet (e.g., whether or not the packet is a "VL15" packet, which partition the packet belongs to, etc.); 2) the service level (SL) of the packet (which, as is known in the art, is an Infiniband packet header parameter that indicates the priority level of the packet); 3) the destination address of the packet, etc. Thus, in a sense, as the arbiter 208 makes bandwidth allocation decisions that are based upon a number of factors, such factors may be embedded with each request as they pertain to its corresponding incoming packet. A more detailed discussion of various arbiter embodiments may be found in U.S. patent application Ser. No. 09/949, 367, filed on 9/7/2001 and entitled "METHOD AND SYSTEM TO MANAGE RESOURCE REQUESTS UTILIZING LINK-LIST QUEUES WITHIN AN ARBITER ASSOCIATED WITH AN INTERCONNECT DEVICE".

Before progressing to FIG. 3, as is consistent with the Infiniband approach, note that in an embodiment each link can support up to 16 different Virtual Lanes (VLs) in the same direction (i.e., input or output). VLs effectively "break down" the traffic being transported by a link so that it can be viewed as a collection of unique traffic flows each having their own specific amount of bandwidth consumption. Typically, each VL on a link is given a number of "credits" where a credit corresponds to an amount of data allowed to be carried by the VL to which the credit is assigned.

A link source node is typically allowed to transmit packets along a particular VL until the credit count for the VL is completely consumed. That is, each transmission of a packet along a particular VL decrements the credit count at the source node for that VL; and, if the credit count is less than the size of the next packet to be sent on that VL, no more transmissions are allowed on the link by the link source node for that VL. After a packet has been received by a link receiving node and switched through the switch core 209, it is re-transmitted by another outgoing link (and therefore another VL). In response, the link receiving node sends the credit count that was consumed by the packet back to the link source node so that the link source node's credit count for the VL can be refreshed (which permits the sending of a subsequent packet).

Overview of Input Port Operation

FIG. 3 shows an embodiment 301 of an input port that may be used for any of the input ports 201₁ though 201ₙ observed in FIG. 2. In an embodiment, the link interface that feeds the input 303 performs bit recovery and byte synchronization from the incoming data stream(s) being received on the input link(s) and the input policing unit 350 performs packet synchronization. That is, is a sense, the link interfaces have no "packet awareness" and merely determine the individual bytes of data that they are receiving. These bytes of data are then passed along the port input 303 to the input policing unit 350.

In an embodiment, the input 303 to the port 301 comprises a "Z byte wide" interface (where Z is an integer). For example, in one embodiment, Z=4. As such, the input 303 (e.g., as well as the output of a link interface such as any of link interfaces 207₁ through 207ₙ of FIG. 2) corresponds to a 4 byte (=32 bit) wide interface. In further embodiment, for 4× speed links, the data rate of the 4 byte wide interface 303 is four times that used for 1× speed links.

According to the design approach of FIG. 3, the aforementioned VL credits (that apply to the link which feeds port input 303) are "kept track of" so that proper link operation can be verified. Specifically, the VL credit registers 380 effectively keep a record of the credits that are available to each VL (or a subset thereof). For each packet that arrives to the input port 303, the pointer RAM manager 341 (as described in more detail below) decrements the credit count (as held within the VL credit register space 380) of the VL that carried the packet.

After the packet is directed to the switch core (in response to a favorable grant from the arbiter), the pointer RAM manager 341 (also as described in more detail below) increments the credit count (as held within the VL credit register space 380) of the VL that carried the packet. Thus, the credit count for a VL is decreased if a packet carried by that VL arrives to the input port 301; and, the credit count for a VL is increased one the packet leaves the input port 301. In an embodiment, as described in more detail below, one credit corresponds to a "block" of data that is 64 bytes.

In an embodiment, the input policing unit 350 determines (e.g., from the parallel stream of bytes that it is receiving from the port input 303): 1) where packets start and end; 2) the VL the packet belongs to; and 3) the size of the packet. These determinations may be made by analyzing each input packet's header information. Based upon the size of the packet and the VL to which the packet belongs, the input policing unit 350 can check the credit count for the packet's VL from the VL credit register space 380 (e.g., via register interface 381) to see if sufficient credits existed on the link to receive the packet. If so, the packet is forwarded to the request manager 322. If not, the packet is dropped and an error notification is raised (because the link is not executing proper flow control).

In various embodiments, where the Infiniband approach has allocated the $0^{th}$ through $14^{th}$ VLs for typical data transportation, only 15 registers (or register fields) are implemented within the VL credit registers 380 (one register/register field for each of VLs 0 through 14). The $15^{th}$ VL (upon which "VL15 packets" flow) is reserved for network maintenance/control information. As VL15 packets are considered "high priority" packets, no flow control is performed and credit counts are not kept track of for a link's VL15 virtual lane. As such, in an embodiment, the input policing unit 350 is designed to not only recognize the arrival of a VL15 packet (e.g., from the packet's header information), but also does not refer to the register space 380 for any VL15 packet. Instead, if a second VL15 packet arrives to the port 301 before a first VL15 packet leaves the port 301, the second packet is automatically dropped. In an alternative embodiment, a fixed number of VL15 packets can be queued before VL15 packets begin to be dropped.

After a packet begins to be received by the input policing unit 350 (and the credit count is sufficient for the packet), it is forwarded to the request manager 322. The request manager 322, then scans the packet's header information and builds a request data structure for the packet. The request data structure is then forwarded to the request data structure to the arbiter (e.g., along the request interface 311). Recall from the discussion above with respect to FIG. 2 that a request data structure may be configured to include: 1) the size of the packet; 2) information that characterizes packet; 2) the service level (SL) of the packet; 3) the destination address of the packet, etc. Each of these may be extracted from the header of the packet.

From the information within the request data structure, the arbiter is able to make a decision as to when the incoming packet should be allowed to progress to the switching core. In an embodiment, a degree of "handshaking" occurs between the request manager 322 and the arbiter that controls the passing of the request data structure. For example, the request interface 311 may include a "hold" line that is directed from the arbiter to the request manager 322.

In an embodiment, the just aforementioned "hold" line, when active, indicates to the request manager 322 that the arbiter is too busy to entertain another request data structure. In response to an active "hold" line, the request manager 322 can store the request data structure into the request queue RAM 326 (e.g., via read/write interface 336). If any more packets are directed to the input port 320 from the link interface while the "hold" line is active, the request manager 322 can continue to build request data structures and store them into the request queue 326.

Subsequently, when the "hold" line is inactivated (which indicates to the request manager 322 that the arbiter is now willing to entertain the submission of a request) the request manager 322 can issue request data structures from the request queue 326. In an embodiment, the request manager 322 notifies the arbiter that it has a request data structure to send to the arbiter (e.g., via activation of a "request-to-send" line that is a component of the arbiter interface 311).

Upon a favorable response from the arbiter (e.g., via activation of a "OK-to-send" line that is a component of the arbiter interface 311), the request data structure is forwarded to the arbiter. In an embodiment, the request queue RAM326 is designed to act as a first-in-first-out (FIFO) queue such that data structures are issued to the arbiter in the order in which they were created (e.g., in the order of the packets that they represent were received by the input port 301).

In an embodiment, as an input packet flows through the request manager 322, it is directed to the packet Rx unit 321. In response, the packet Rx unit 321 writes the input packet into the into the input packet RAM 327 (e.g., along write channel 331). In an embodiment, as seen in FIG. 3, the input packet RAM 327 is constructed with separate random access memory (RAM) chips (e.g., RAM1 through RAM4, $327_1$ through $327_4$).

Note that the packet as a whole can be processed in a piecemeal fashion. That is, for example, while a first segment of the packet is being stored into the Input packet RAM 327 by the packet Rx unit 321, a following, second segment of the packet is flowing through the request manager 322 and a further following third segment is flowing through the input policing unit 322. Thus, in a sense, as pieces of the packet arrive at the packet Rx unit 321, they are stored into the Input packet RAM 327.

The pieces that have been stored in the input packet RAM 327 then wait (within the Input packet RAM 327) until a grant is received for the packet from the arbiter. In the embodiment of FIG. 3, a grant is received from the arbiter by the packet Tx unit 323 along the grant interface 312. Note that having separate request and grant interfaces 311, 312 allows a grant for a first packet to be issued from the arbiter simultaneously with the issuance of a request data structure for a second packet to be issued by the request manager 322.

In an embodiment, each request data structure also includes a pointer that indicates where a first piece of the corresponding packet is stored within the Input packet RAM 327. The same pointer value is then included in the grant for the packet, so that the packet Tx unit 323 understands where the next packet to be forwarded to the switching core is to be found. Upon the receipt of a grant, the packet Tx unit 323 uses the pointer to begin reading the packet from the Input packet RAM 327 (e.g., along read channel 330), from where it is directed to one of the port outputs $313_1$ through $313_3$.

In order to reduce latency, a packet may begin to be removed from the Input packet RAM 327 before it is completely written into the Input packet RAM 327. As such, for a packet of sufficient length, the possibility exists that a packet can be both an incoming packet and an outgoing packet at the same time. FIGS. 4 and 5 elaborate on this possibility in more detail. Specifically, FIG. 4 shows a conceptual depiction of a packet that is being received while it is also being transmitted; and, FIG. 5 shows a methodology that can be executed by the input port 301 of FIG. 3 which may result in simultaneous reception and transmission of the same packet.

FIG. 4 shows how a packet can be an incoming packet and an outgoing packet at the same time. As an example, assume that the packet is properly switched by being received on link $406_1$ and by being transmitted on link $406_n$. That is, referring briefly back to FIG. 2 and using the switch 205 of FIG. 2 as a model for the switch 405 of FIG. 4, the packet is: 1) received upon link $206_1$; 2) switched by the switching core 208 from switching core input $213_1$ to switching core output $210_n$; and 3) transmitted upon $206_n$.

As the packet is switched according to the process described above, note that the packet may be viewed as having three different components. These include a first portion 410a that is being received on link $406_1$; a second portion 410b that is being processed within the switch 405; and, a third portion 410c that is being transmitted on link $406_n$. Referring back to FIG. 3, with respect to the operation of the input port 301, note that in order to simultaneously transmit and receive the same packet: 1) the request data structure is issued to the arbiter by the request manager 322 before the entire packet has been fully stored in the Input packet RAM 327; 2) a favorable grant from the arbiter is received by the packet Tx unit 323 before the entire packet has been fully stored in the Input packet RAM 327; and 3) while earlier received portions of the packet are being read from the Input packet RAM 327 by the packet Tx unit 323, later received portions of the packet are being written into the Input packet RAM by the packet Rx unit 321.

The ability to begin the process for transmitting a packet before the packet has been fully received may be referred to as "cut-through". FIG. 5 shows a methodology that can be performed by the input port 301 of FIG. 3 and that allows the input port 301 of FIG. 3 to switch a packet in a "cut-through" fashion. According to the approach of FIG. 5, once a packet has begun to be received 550 at an input port, two parallel processing sequences are executed. A first processing sequence 551 through 553 is directed to switching the packet; and, a second processing sequence 554 is directed to storing the packet into the Input packet RAM.

Referring to FIGS. 3 and 5, the sequences directed to switching the packet include: 1) issuing 551 a request data structure to the arbiter (e.g., by the request manager 332); 2) receiving 552 (e.g., by the packet Tx unit 323) a favorable grant from the arbiter in response; and 3) removing 553 from the Input packet RAM 327 (for forwarding to the switching core) those portions of the packet that have already been received and stored into the Input packet RAM 327. The sequence directed to storing 554 the packet involves writing portions the packet into the Input packet RAM 327 as it is received in piecemeal fashion as described above.

These parallel processing sequences may be viewed as being independent with one another in the sense that, in various embodiments, shortly after a packet arrives to the input port the input port both: 1) notifies the arbiter of the packet's arrival (and is prepared to begin forwarding the packet to the switching core as soon as the arbiter issues a grant); and 2) stores portions of the packet into the Input packet RAM 327 as they arrive (in a piecemeal fashion). If the arbiter responds "quickly" to the request data structure that was issued 551 (i.e., by providing a grant before the packet has been fully received and stored into the Input packet RAM 327), then earlier received portions of the packet will likely be removed from the Input packet RAM 327 before the packet has been completely stored in the Input packet RAM 327. That is, a "cut-through" switching process will likely be executed.

Here, depending on the size of the packet and how quickly the request data structure was responded to, the packet may be transmitted as an outgoing packet while it is being received as an incoming packet. If, on the other hand, the arbiter responds "slowly" to the request data structure that was issued 551 (i.e., by providing a grant after the packet has been fully received and stored into the Input packet RAM 327), then the packet will be switched according to a "store-and-forward" technique (wherein the packet is fully stored in the Input packet RAM 327 before it begins to be removed from the Input packet RAM 327 for switching through the switch core).

As such, the time consumed between sequences 551 and 552 largely determines whether the packet is: "cut-through"; or, is "stored-and-forwarded". As the arbiter is responsible for understanding the offered load being presented to the switch and making a decision as to when it is appropriate to respond to a request data structure, the exact time consumed between sequence 551 and sequence 552 may depend on various factors such as the type of packet, the service level (SL) of the packet, the speed of the links that the packet is received upon/transmitted from, etc.

However, in those cases where it is appropriate to begin switching a packet before it has been fully stored in the Input packet RAM 327, the input port 301 is designed to support this functionality because of: 1) the independent, parallel processing sequences referred to just above; and, 2) the design point of the request manager 322 wherein the request data structure for a packet is issued 551 to the arbiter before the packet has been fully received and stored. Because of the design point of the request manager 322 described just above, the arbiter is usually made aware of the packet's arrival before the packet has been fully received.

FIG. 6 shows an embodiment of a methodology that may be executed by the request manager 322 of FIG. 3 so that the request data structure for an incoming packet is issued to the arbiter before the packet is fully received and stored within the Input packet RAM 327. In an embodiment, as discussed, the header information of each incoming packet is "scanned" by the request manager 322 so that it can characterize each incoming packet.

Accordingly, with reference to the methodology of FIG. 6, a request data structure is issued 602 as soon as the request manager 322 realizes that the incoming packet is a VL15 packet. VL15 packets are high priority packets whose payload includes network control information (e.g., an event report such as a report that another link or switching node is "down", a command to a switching node such as a command that issued from a network management control station, etc.). Since it is usually wise to "update" the network as soon as practicable, making a network control packet high priority packet allows network configuration information, commands to the networking node, etc., to swim through the network quickly regardless of the networking conditions that exist at the time of their issuance. As discussed above, the $15^{th}$ virtual lane (i.e., VL15 where the sixteen available VLs are numbered from 0 to 15) on each link is reserved for the use of control information. As such, if the packet is a VL15 packet 601, the request manager 322 immediately issues 602 a request data structure to the arbiter that indicates the packet is a VL15 packet.

In other cases the arbiter may desire to know the partition information within the packet's header. Each Infiniband packet header typically has a field reserved for indicating the partition to which the packet belongs (if any). In some cases, the arbiter may desire to know the contents of this field. For example, as just instance, if a switch sits one the edge of partition within the network, the switch may be configured to police the entrance of packets into the partition (e.g., by allowing packets that belong to the network partition while rejecting others that do not belong to the network partition). As such, the request manager 322 may be told by the arbiter to include each packet's partition information within the request data structure so that it can "check" the partition information against some pre-determined criteria.

Thus, as seen in FIG. 6, if partition checking is to be done 603, the packet header information is scanned until the partition information field of the packet is observed 604 so that a request data structure can be issued to the arbiter that includes the partition field information. Alternatively, if partition checking is not to be done, the packet header information is scanned until the "packet size" field of the header is observed 605; at which point, a request data structure is issued 605 that includes the packet size information. Note that as the Infiniband packet header places the packet size information "ahead of" the partition field information, a request is issued later in the arrival time of the packet if partition checking is performed (as compared to triggering a request off of the observation of the packet size). As such, the packet size information can be included in the request data structure in cases where partition checking is performed.

Packet Rx Unit

FIGS. 4 through 6 related to embodiments of the input policing unit 350 and the request manager 322. FIG. 7, relates to an embodiment for a manner in which packets can be stored into the Input packet RAM 327 by the packet Rx unit 321. Note that just as the request manager 322 can be designed to help support cut-through operation because the request data structures are issued "early" in the packets arrival as demonstrated by the methodology of FIG. 6, the manner in which packets are stored and kept track of within the Input packet RAM 327 also assist in cut-through operation. Specifically, as described in more detail below, packets are broken down into blocks of data so that while blocks of newly arriving packet data are being written into the Input packet RAM 327, other blocks of earlier arrived data from the same packet can be read from the Input packet 327 for transmission to the switching core.

Referring to FIG. 3, recall that the Input packet RAM 327 may be designed as a plurality of separate RAM chips (e.g., four RAM chips $327_1$ through $327_4$ as observed in FIG. 3). In an embodiment, smaller pieces of the blocks of data are stored in succession across the RAM chips $327_1$ through $327_4$ at the same address prior to using a next address to store more data. FIG. 7 shows an example in more detail. Referring to the methodologies $703_1$ through $703_4$ of FIG. 7 and the Input packet RAM 327 of FIG. 3, note that the (N)th, (N+1)th, (N+2)th, and (N+3)th words of the packet are written in succession by write operations $703_1$, $703_2$, $703_3$, and $703_4$, respectively. A word corresponds to the data width of a particular RAM chip. In an embodiment, each of the RAM chips $327_1$ through $327_4$ has a 32 bit wide data bus. Thus, in this case, a word is a 32 bit piece of a packet.

Note that each of write operations $703_1$, $703_2$, $703_3$, and $703_4$ are performed at the same address. As such, the (N)th, (N+1)th, (N+2)th, and (N+3)th words are located at the same locations within their corresponding RAM chips. Thus, as a broader perspective, the Input packet RAM 327 may be viewed as a single memory having a "wide word" that corresponds to the total bus width across all of the RAMs together. For example, if each RAM has a 32 bit wide data bus, a wide word will corresponds to a 128 bits. Thus, the writing of a wide word 703 corresponds to the writing of 128 bits of packet information at a common address. Note that write operations $703_1$, $703_2$, $703_3$, and $703_4$ may be performed in parallel (e.g., simultaneously) rather than serially as suggested by FIG. 7. The parallel operation may be partial (e.g., write operations $703_1$, $703_2$ are performed in parallel; and, in a following write sequence write operations $703_3$, and $703_4$ are performed in parallel). Generally, as the write operations become more parallel, more register space is used. Those of ordinary skill can determine the appropriate amount of register space to use.

In an embodiment of FIG. 3, the particular address to use is supplied by the pointer RAM 329 (or derived from an address that has been supplied by the pointer RAM 329). In a further embodiment, as alluded to above, the packet data is organized within the Input packet RAM 327 according to blocks of data. In an embodiment, each block corresponds to 64 bytes worth of data. Thus, in an embodiment where a wide word corresponds to 128 bits (which is equal to 16 bytes), the writing of four separate wide words corresponds to the writing of a complete block (as 64 bytes=4×16 bytes).

Accordingly, in an embodiment, the pointer RAM 329 supplies the first address for a block and the packet Rx unit 321 is able to calculate the remaining addresses for the block (e.g., because they are each a binary increment of the preceding address). FIG. 7 can be used to demonstrate an example. As an initial procedure, the packet Rx unit 321 requests a "starting" address for a block from the pointer RAM manager 341 (e.g., by signaling a request along pointer RAM manager interface 360). For simplicity, a block of data may be referred to simply as a block. Note that embodiments are possible where a block is some amount of data other than 64 bytes.

The pointer RAM manager 341, as described in more detail further below, is responsible for understanding which addresses of the Input packet RAM 327 are available for storing new packet data. Thus, in response to the request by the packet Rx unit 321, the pointer RAM manager 341 provides a block start address (e.g., again, along pointer RAM manager interface 360). This corresponds to the start phase 702 of the methodology of FIG. 7. For each new block start address, a variable N is used to count the number of writes (so that the writing of a complete block can be tracked). Note that in the embodiment of FIG. 7, as observed at start phase 702, for each new block start address obtained from the pointer RAM manager 341 the value of N is reset to a preliminary value of N=0.

Then, a wide word is written 703 into the Input packet RAM 327 at the block start address that was just provided. As the embodiment of FIGS. 3 and 7 correspond to a four RAM $327_1$ through $327_4$ implementation, the writing 703 of a wide word corresponds to four word writes (one into each of RAMs $327_1$ through $327_4$). Here, each value of N corresponds to a next word of packet data. By incrementing the value of N for each word write, after the first wide word has been written, four words worth of packet data will have been written into the Input packet RAM 327 and the value of N will be N=4. Note again that the four words may be written in parallel.

Thus, for a 128 bit wide word width, $\frac{1}{4}^{th}$ of a complete 64 byte block will have been written and three more wide words are to be written (such that N=16) before a complete block has been written. Thus, because N is not equal to 16 after the writing of the first wide word, a next block address is determined 705 and another wide word is written 703. In an embodiment, the next block address is a logical increment of the previous address used.

Thus, for example, if the block start address for the first wide word write 703 (N=1 through N=4) was 000000000; the address to be used for the second wide word write 703 (N=5 through N=8) will be 000000001; the address to be used for the third wide word write 703 (N=9 through N=12) will be 000000010; and, the address to be used for the fourth wide word write 703 (N=13 through N=16) will be 000000011. After the fourth wide word write, N=16, and a complete block has been written.

Referring to FIGS. 3 and 7, after a complete block has been written, the error status (or "error tag") of the block that was just written is stored 706 in the error RAM 354 (e.g., via error RAM interface 352); and, the virtual lane of the packet that the block data is a component of is stored 707 into the virtual lane RAM 357 (e.g., via virtual lane RAM interface 355). Note that, in the embodiment of FIG. 7, the start address of the block is used to store 706, 707 these variables so that the error and virtual lane information that pertains to a particular block can be obtained by referring to its particular start address.

As the original start block address is exhausted after a block has been written, a next block start address is obtained (e.g., by making another request to the pointer RAM manger 341) and N is reset to a value of N=0. The process then repeats for subsequent blocks. Note that, in the embodiment referred to above, there are four unique addresses per block. As such, the start block addresses that are used by the input port 301 may be configured as a string of numerical values that effectively count by fours (e.g., 000000000, 00000100, 000001000, 000001100, etc.).

Before continuing, it is important to also note that those of ordinary skill will be able to configure a block write methodology that conforms to the methodology 754 of FIG. 7 yet: 1) the number of RAMs employed is different that four RAMs; 2) a word width is different than 32 bits; and 3) the block size is different than 64 bytes. As such, the specific N value used to trigger the completion of a block write sequence can be other than 16 as described above.

Pointer RAM Management

Recall that the pointer RAM manager 341 is responsible for understanding which addresses of the VL input packet RAM 327 are available for storing new packet data. FIGS. 8 and 9 relate to an embodiment as to how the pointer RAM manager 341 may be designed to operate. FIG. 8 shows exemplary contents of the pointer RAM 329 at different moments in time as four different packets flow through the input port. The pointer RAM has the block start addresses used by the input port within its data fields. For simplicity, in the example of FIG. 8, only 14 addresses (0 through 13) and corresponding data fields are shown. Other embodiments may have more addresses.

The pointer RAM 329 effectively keeps track of the blocks within the input port Each block is "referred to" by its start address. Blocks may be viewed as being used or being "free". Used blocks are allocated to particular packets. Through the use of link lists, the pointer RAM effectively keeps track of which blocks are free; and, which blocks are allocated to which particular packet. The example of FIG. 8 as described in more detail below will demonstrate this more clearly.

FIG. 8 shows the state of the pointer RAM at eight different moments in time (T1 through T8) as packets enter and exit the Input packet RAM 327. Time T1 correspond to a moment in time when the switch to which the input port belongs is initially brought up. As such, no packets have yet to enter the input port and all the blocks are "free" (i.e., unused). Referring to FIGS. 3 and 8, the pointer RAM manager 341 maintains a "Next Free" register which has not been shown in FIG. 3 for simplicity. However, the values of the "Next Free" (NF) register are drawn in FIG. 8 for each moment of time. The value of the Next Free register helps the pointer RAM manager 341 issue appropriate block start addresses as described in more detail below.

The "Next Free" register stores the next block start address to be issued to the packet RX unit 321. That is, upon a request for a block start address by the packet RX unit 321 (e.g, as described with respect to state/method 702, 708 of FIG. 7), the contents of the "Next Free" register will be provided to the packet Rx unit 321. The contents of the "Next Free" register are also used as a pointer that points to the address of the pointer RAM 329 from where the next block start address to be issued to the packet Rx unit will be obtained. In FIG. 8, the pointer is labeled as an "NF".

FIG. 9a shows an embodiment of a methodology that may be executed by the pointer RAM manager 341 to manager the contents of the NF register. Note that if a request is issued by the packet Rx unit 321, the contents of the "Next Free" register are issued 902 to the packet Rx unit and are used as a read address to read 903 the pointer RAM 329. The value that is read is then stored 904 in the "Next Free" register.

The methodology is workable because the free blocks within the pointer RAM are configured as a link list at time T1 as seen in FIG. 8. As such, a data value read from the pointer RAM at the address held by the Next Free register contents automatically corresponds to the address for the next free block of data. That is, because the contents of the "Next Free" address are configured as an initial default to have a value of 0 (as seen at time T1), the first block start address requested by the packet Rx unit 321 will have a value of 0, the second will have a value of 1, the third will have a value of 2, etc.

Thus if a first packet arrives and consumes 5 blocks worth of data, as seen at time T2, according to the methodology of FIG. 9 the "Next Free" register will have a content value of 5 because that is the value that was stored at address 4 (which is the last block start address value to be used by the first packet). In a similar fashion as seen at time T3, if a second packet arrives that consumes 4 blocks worth of data, the Next Free register value will be 9 after the last block start address for the packet has been issued to the packet Rx unit 321. If a third packet arrives that consumes another four blocks, as seen at time T4, all of the blocks will be consumed up to address 12.

In the embodiment of FIG. 8, note that the maximum number of blocks that can be used (as represented by the block start addresses that are listed in the pointer RAM's data field) is less than the number of addresses that can be used to access the pointer RAM (as represented by the addresses listed in the pointer RAM's address data field). Specifically, as the exemplary case of FIG. 8 demonstrates, there is number of data blocks that can be used is one less than the number of pointer RAM addresses that can be used. As such, although 14 of the pointer RAM's addresses can be used (e.g., across an address range of 0 through 13), only 13 block start addresses can be listed (across a block start address range of 0 through 12) in the pointer RAM's data field.

Thus, at time T4, all of the block start addresses used by the input port are "used". As such, no free block start addresses exist. Furthermore, consistent with the operation of the Next Free register update process observed in FIG. 9a, the "Next Free" register value points to "extra" address location 13 after the third packet has consumed the last available block start address of 12. The use of the extra address location 13 helps to simplify the design of the pointer RAM manager 341.

By time T5, note that the second packet to be received is the first packet to be released. Recalling that a grant issued by the arbiter includes the initial block start address for the packet (i.e., address 5 in this case), when the grant for the second packet was issued to the packet Tx unit 323 (e.g., shortly after time T4), the packet Tx unit 323 (in response) read the first block of data from the Input packet RAM 327 (with the block start address of 5 that was included in the grant) while simultaneously submitting the block start address of 5 to the pointer RAM manager 341 (e.g., along pointer RAM manager interface 360).

In an embodiment, the sending of a block start address from the packet Tx unit 323 to the pointer RAM manager 341 (e.g., after the block start address has been used to begin the release of the correponding block from the input packet RAM 327) triggers the sending of the next block start address in the pointer RAM's link list to the packet Tx unit 323. That is, referring to FIGS. 3 and 9b, the pointer RAM manager 341 reads 905 the pointer RAM 329 at the block start address that was sent by the packet Tx unit 323; and, forwards 906 the value read from the pointer RAM 329 (which corresponds to the next block start address in the link list) to the packet TX unit 323 (so that the next block of data for the packet can be read from the input packet RAM 327 by the packet TX unit 323).

Thus with respect to the example of FIG. 8, after the packet TX unit 323 sent the block start address of 5 to the pointer RAM manager 341 (between times T4 and T5), the pointer RAM manager 341 used the block start address of 5 to "look up" 905 the next block start address of the packet's link list. According to the link list structure observed in FIG. 8, the next block start address in the link list after address 5 (i.e., the data field at address 5) corresponds to a value of 6. The block start address of 6 is then provided 906 to the packet TX unit 323 (e.g., along pointer RAM manager interface 361); which, in response, uses it to read the next block of the packet from the Input packet RAM 327.

Note that the sending of a block start address from the packet Tx unit 323 to the pointer RAM manager 341 may often be viewed as the "return" of the block start address so that it may be added to the link list of free blocks. That is, when a block start address is being used to read a part of a packet from the input packet RAM 327, note that at a previous time the same block start address was given to the packet Rx unit 321 by the pointer RAM manager 341 (in response to a request from the packet RX unit 321 for a free block start address to store the part of the packet). This activity effectively converted the block start address from being "free" to being used.

As such, when the block start address is returned by the packet Tx unit 323 to the pointer RAM manager 341 (because its corresponding data is being sent to the switch core), it may signify that the block start address is now "free" and can therefore be added to the link list of free block start addresses. Referring to FIGS. 3, 8 and 9b, the tail pointer address (shown as a "T" in FIG. 8) is used to point to the location where the address value of a newly freed block start address (that has just been returned by the packet Tx unit 323) is to be written into 908 the pointer RAM. Note that, in the embodiment of FIG. 8, the tail pointer automatically starts (at time T1) at the "bottom" of the address field at address 13.

Thus, when the initial block start address value of 5 for the second packet was returned to the pointer RAM manager 341 (between times T4 and T5), a block address value of 5 was written into 908 address 13 of the pointer RAM 329; and, the tail pointer value set 909 to an address of value of 5. Note that the later process 909 effectively sets the tail pointer to the value of the most recently freed block start address. As such, the link list of free block start addresses is continually built upon itself in the sequence that freed block start addresses are returned to the tail pointer manager 341 by the packet Tx unit 323.

Recall that the return of the initial block start address of 5 triggered a look up 905 into the pointer RAM for the next block start address in the link list (i.e., address 6) so that it could be forwarded 906 to the packet TX unit 323 (and used to read the block of data starting at address 6). Subsequently, the block start address of 6 was returned to the pointer RAM manager 341. In this case, the pointer RAM was read 905 at address 6 to look up the block start address for the next block in the link list (address 7); which, was then forwarded 906 to the packet Tx unit 323 to read the buffer that starts at address 7.

As the tail pointer value was "5" when the block start address value of 6 was returned, a value of "6" was written 903 into the pointer at address 5; and, the tail pointer value was reset 909 to a value of "6". The process continued until the last address for the second packet to be received (i.e., address 8) was read from the packet input RAM 327 and returned by the packet Tx unit 323 to the pointer RAM manager 341. As such, by time T6 when the second packet had been completely read from the input packet RAM 327, the tail pointer was set to address 8.

In an embodiment, the grant from the arbiter not only includes the initial block start address for the packet to be forwarded to the switching core but also includes a "block count" which identifies how many linked blocks are to be read out from the input packet RAM 327 (so that only those contents of the input packet RAM 327 that correspond to the packet referred to in the grant are read from the RAM 327). As such, in this case, the packet Tx unit 323 is "smart enough" to know when to stop returning block start addresses so that it can receive a next block start address in the link list.

As such, referring to the example of FIG. 8, because the packet Tx unit 323 knew that four buffer start addresses made up the second packet to be received; the packet Tx unit 323 knew that address 8 is the last buffer start address to use when reading out that packet. As such, when the packet Tx unit 323 returned the address value of 8 to the pointer RAM manager 341 so that it could be added to the free link list—the packet Tx unit 323 was smart enough to either ignore the value from the look up 905 that was delivered 906 by the pointer RAM manager 341 in response; or, explicitly tell the pointer RAM manager 341 not to bother performing the look up 905 at all.

Time T6 represents the state of the pointer RAM after the packet Tx unit 323 has received a grant from the arbiter for (and has completely read out) the first packet to be received (which had block start addresses spanning from address 0 to address 4. As the tail pointer was pointing to address 8 at time T5, the initial block start address for the first packet to be received (i.e., address 0) nwas written 908 at address 8. As such, as of time T6, the free block link list spans from address 13 (which remains as the "Next Free" address because no new packets have been received since after time T4) to address 5, from address 5 to address 8, from address 8 to address 0, and from address 0 to address 4.

Between times T6 and T7, the Tx packet unit 323 has both: 1) received a grant for the third packet to be received (which had its block start addresses span addresses 9 through 12); and, 2) has completely read the third packet to be received from the Input packet RAM 327. As no new packets have been received since time T4: 1) the "Next Free" remains pointed to address 13; 2) the pointer RAM is comprised entirely of free block start addresses; and 3) the "Tail Pointer" points to the address 12 which corresponds to the last address used by the third packet to be received.

Between times T7 and T8, a fourth packet arrives having a payload size that requires the use of eight blocks. As such, the Next Free value is used to provide the initial block start address at address 13. Accordingly, the link listed free block lists provides block start addresses according to a 13-5-6-7-8-0-1-2 link list. After the last address for the packet has been issued to the packet Rx unit 321, the Next Free pointer points to address 3 consistent with the methodology of FIG. 3.

Before moving forward to a discussion of the Packet Tx unit, a few comments are in order. Firstly, recall from FIG. 3 that the pointer RAM manager 341 may be designed to effectively keep track of the available credits for the VLs on the link that feeds the input port 301. In an embodiment, a number of credits are allocated for each block of data (e.g., one credit per block). As such, after a packet arrives to the input port and its applicable VL is obtained from the packet header, in an embodiment, each time a free block start address is requested for that packet by the packet Rx unit 321, the pointer RAM 341 manager "decrements" the credit count for the VL in the VL credit register space 380. In an embodiment, the packet Rx unit 321 informs the pointer RAM manager 341 of the applicable VL for each request. The Packet Rx unit 321 can be made aware of the VL from the request manager 322 or the input policing unit 350.

Similarly, each time a block start address is returned to the pointer RAM manager 341 and is deemed "free" so that it can be added to the free link list within the pointer RAM 329, the pointer RAM manager 341 "increments" the credit count for the VL in the VL credit register space 380. As described in more detail in the following section, the packet Tx unit 323 can become made aware of the VL to which an outgoing packet belongs by performing a look up in the VL RAM 357.

Secondly, in some cases a series of block start address may be used to read out a packet from the input packet RAM which are returned to the pointer RAM manager by the packet Tx unit as described just above; however, they are not deemed "free" buffer start addresses upon their return. As such, processes 908 and 909 of FIG. 9b are not performed so that they are not added to the free link list. As described in more detail below in the next section, various packets may be "multicasted" which requires multiple readings of the same packet from the input packet RAM 327 at different times. As such, it is not until the last reading of the packet that its corresponding block start addresses are deemed "free" and they are added to the free buffer start address link list. Inquiry 907 of FIG. 9b effectively handles whether or not the block start address is applicable to block of data from a multicasted packet that is not undergoing its final reading from the input packet RAM 327.

Packet Tx Unit

FIGS. 10 and 11 relate to an embodiment of the packet TX unit of FIG. 3. FIG. 10 shows an architectural design 1023 for the packet TX unit 323 of Figure. FIG. 11 shows a scheduling methodology that can be implemented by the packet TX unit 1023 of FIG. 10. The packet TX unit embodiment 1023 of FIG. 10 is designed to read from the four RAMs (RAMs $327_1$ through $327_4$) of FIG. 3. As such, four read channels 1021 through 1024 are observed in FIG. 10, one for each RAM.

That is, referring to FIGS. 3 and 10, read channel 1021 (RC1) reads words from RAM $327_1$, read channel 1022 (RC2) reads RAM $327_2$, read channel 1023 (RC3) reads RAM $327_3$, and read channel 1024 (RC4) reads RAM $327_4$. Furthermore, recalling that the packet TX unit embodiment 323 of FIG. 3 is capable of simultaneously transmitting three different packets to the switching core over three different outputs $313_1$ through $313_3$; referring to FIG. 10, a first packet can be transmitted over output $1013_1$ while a second packet is being transmitted over output $1013_2$ while a third packet is being transmitted over output $1013_3$.

As such, appropriate interweaving between the read channels 1021 through 1024 and the multiplexers 1005 through 1007 is performed such that: 1) multiplexer 1005 (MUX1), which sources the first output $1013_1$, is provided a proper sequence of words from read channels 1021 through 1024 such that a first outgoing packet is correctly formed; while 2) multiplexer 1006 (MUX2), which sources the second output $1013_2$, is also provided a proper sequence of words from read channels 1021 through 1024 such that a second outgoing packet is correctly formed; and while 3) multiplexer 1007 (MUX3), which sources the third output $1013_3$, is also provided a proper sequence of words from read channels 1021 through 1024 such that a third outgoing packet is correctly formed.

FIG. 11 demonstrates an example of the aforementioned interweaving via the illustration of a partial scheduling for the release of three different packets. Specifically, FIG. 11 shows the RC1 through RC4 read channel addressing 1120 and the MUX1 through MUX3 channel selection control 1130 for a first packet "P1" which is transmitted from MUX1, a second packet "P2" which is transmitted from MUX2 and a third packet "P3" which is transmitted from MUX3. A discussion of the scheduling of each of these packets follows immediately below.

Recalling from the discussion of FIG. 7 that a wide word is written 703 by writing a word into each RAM at the same address $703_1$ through $703_4$; similarly, a full word is read from the Input packet RAM by reading a word from each RAM at the same address. Referring to FIGS. 10 and 11, a block start address for the first packet "P1/BSA" is used by read channel RC1 1021 at time T1, by read channel RC2 1022 at time T2, read channel RC3 1023 at time T3 and read channel RC4 1024 at time T4. As such, a full word reading for the first full word of a packet P1 block occurs across time T1 through T4.

In order to implement this reading, according to the packet TX unit 1023 design approach of FIG. 10, the scheduler and control unit 1030 passes the block start address for the first packet "P1/BSA" to RC1 1021 (along address passing lane 1029) sometime prior to time T1. In response, RC1 1021 reads a first word at the P1/BSA address at time T1. Since the first packet P1 is to be released from output $1013_1$, the channel select line 1071 of MUX1 1005 is configured to select the output of RC1 1005 at time T1 (as observed 1130 if FIG. 11 for the "MUX1" scheduling table entry).

The P1/BSA address is next passed to RC2 1022 (along address passing lane 1025) by RC1 1021 sometime prior to time T2 (e.g., between times T1 and T2; or, during time T1). In response, RC2 1022 reads a second word at the P1/BSA address at time T2. Since the first packet P1 is to be released from output $1013_1$, the channel select line 1071 of MUX1 1005 is configured to select the output of RC2 1006 at time T2 (as observed 1130 if FIG. 11 for the "MUX1" scheduling table entry).

The P1/BSA address is next passed to RC3 1023 (along address passing lane 1026) by RC2 1022 sometime prior to time T3 (e.g., between times T2 and T3; or, during time T3). In response, RC3 1023 reads a third word at the P1/BSA address at time T3. Since the first packet P1 is to be released from output $1013_1$, the channel select line 1071 of MUX1 1005 is configured to select the output of RC3 1007 at time T3 (as observed 1130 if FIG. 11 for the "MUX1" scheduling table entry).

The P1/BSA address is next passed to RC4 1024 (along address passing lane 1027) by RC3 1023 sometime prior to time T4 (e.g., between times T3 and T4; or, during time T4). In response, RC4 1024 reads a fourth word at the P1/BSA address at time T4. Since the first packet P1 is to be released from output $1013_1$, the channel select line 1071 of MUX1 1005 is configured to select the output of RC4 1008 at time T4 (as observed 1130 if FIG. 11 for the "MUX1" scheduling table entry).

The P1/BSA address is next passed to the scheduler and control unit 1030 (along address passing lane 1028) by RC4 1024. After the P1/BSA address has been received by the scheduler and control unit 1030, the P1/BSA will have completed a "full loop" through each of the four read channels RC1 through RC4. As such, the reading of a wide word and its emission from the Input packet RAM to the switching core is recognized, and an address change is in order.

Recalling from the discussion of FIG. 7 that, in an embodiment, four wide words are written per block; in a corresponding packet Tx unit embodiment, four wide words are read per block. As such, in order to read a block's worth of information, four different addresses are "looped" through the read channels RC1 through RC4. In an embodiment, for each block's worth of information to be read, one block start address is retrieved from the pointer RAM manager 341 and the additional addresses for the block are determined by the scheduler and control unit 1030.

For example, consistent with the embodiment discussed with respect to FIG. 7 wherein block start addresses are incremented in powers of four (e.g., 000000000, 00000100, 000001000, 000001100, etc.) so that the packet RX unit 321 can determine three additional addresses per block write into the Input packet RAM 327 (e.g., 000000001, 000000010, and 000000011 for a block start address of 000000000), the scheduler and control unit 1030 of the packet TX unit 323 is designed to calculate three read addresses per block start address so that a block can be read from the Input packet RAM 327.

Thus for example, after receiving a grant from the arbiter (along grant interface 1012) having an initial block start address of 000000000 for its corresponding packet, the scheduler and control unit 1030 will issue the 000000000 initial block start address along address lane 1029 so that it can loop through the read channels 1021 through 1024. After the initial block start address is received by the scheduler and control unit 1030 along address lane 1023, the scheduler and control unit 1030 increments the initial block start address by 1 to form a next address value of 000000001. This next address value is then looped through the read channels 1021 through 1024.

The scheduling diagram of FIG. 11 reflects the new incremented address value. Specifically, notice that after the initial block start address for packet P1 (i.e., P1/BSA) is used by the RC4 read channel 1024 at time T4, the P1/BSA value is incremented to form a next address value of "P1/BSA(+1)" that is used over times T5 through T8. Thus, if the P1/BSA value is 000000000, the P1/BSA(+1) value is 000000001. As seen in the scheduling diagram of FIG. 11, the P1/BSA(+1) address is used by read channels RC1 through RC4 at times T5 through T8 respectively (and the MUX1 1005 channel select 1071 is configured to select read channels RC1 through RC4 at times T5 through T8, respectively).

Consistent with this methodology, although not shown in FIG. 11, is that the scheduler and control unit 1030 will: 1) increment the P1/BSA(+1) address to form a P1/BSA(+2) address that is looped through read channels RC1 through RC4 at times T9 through T12; and, afterward, 2) increment the P1/BSA(+2) address to form a P1/BSA(+3) address that is looped through read channels RC1 through RC4 at times T13 through T16. After the P1/BSA(+3) address is returned to the scheduler and control unit 1030, a complete block will have been read from the Input packet RAM. A methodology can therefore be envisioned for the reading of a block by referring to the methodology of FIG. 7 and replacing the words "store" and "write" with the word "read"; and replacing the words "into" and "in" with the word "from".

Note also that, on a broader scale, other embodiments may be designed for the packet TX unit 323 of FIG. 3 that are different than the specific embodiment 1023 of FIG. 10. For example, as just one possible approach, a packet Tx unit can be designed that reads wide words from the input packet RAM 327 in a large parallel operation for a packet (rather than a series of smaller word reads for a packet). Various combinations may be designed as to parallel/serial write/read for the packet Rx and packet Tx units. For example, one input port design may execute parallel, wide word writing at the packet Rx unit; yet, execute serial word reading at the packet Tx unit (or vice-versa).

In an embodiment, during the reading of a first block, a next block start address is requested so that the next block in the packet's link list can be read from the Input packet RAM. The request may take various forms as described above with respect to FIGS. 8 and 9. Specifically, as one approach, the block start address "BSA" for the block being read may be returned to the pointer RAM manager 341 (e.g., via the pointer RAM manager interface 1061) as an implicit form of request for a next block start address. Alternatively, an explicit request can be made. Further still, no request is made and the pointer RAM manager simply supplies the next block start address to be read.

Regardless as to how a next block start address is obtained, when received by the scheduler and control unit 1030, it is eventually issued in a timely manner along address lane 1029 for a loop through read channels RC1 1021 through RC4 1024. Also, regardless as to how a next block start address is obtained, in various embodiments the block start address of a block being read (or recently read) is returned to the pointer RAM manager 341 (e.g., so that it can be link listed as a "free" block start address).

Note that FIG. 11 also shows three packets being simultaneously transmitted. That is a second packet "P2" is being issued from the second multiplexer 1005, and a third packet "P3" is being issued from the third multiplexer 1007. The packet Tx unit 1023 is able to simultaneously transmit multiple packets because the appropriate block start addresses for each packet effectively simultaneously progress through different regions of the loop.

That is, for example, as seen in FIG. 11 at time T3: 1) read channel RC1 1021 reads the initial block start address for the third packet "P3/BSA"; 2) read channel RC2 1022 reads the initial block start address for the second packet "P2/BSA"; and 3) read channel RC3 1023 reads the initial block start address for the first packet "P1/BSA". This operation is possible because as grants are received by the arbiter and space becomes available in the loop, the initial block start address from each grant is inserted into the loop.

The multiplexers MUX1 1005, MUX2 1006, MUX3 1007 are given appropriate channel select control information as indicated in FIG. 11. Specifically, in an embodiment, each time a block start address is issued from the scheduler and control unit 1030 along address lane 1029 (to the first read channel RC1 1021) a "queued package" of MUX control signals is sent to the multiplexer control logic that controls the multiplexer to which the packet that will be read by the just issued block start address is directed.

A mux control signal indicates which read channel output is to be selected; and, a queued package is a collection of control signals that are to be read out in sequence over time. Thus as a packet (P1) begins to be read, the multiplexer that forwards the packet to the switching core will have its control logic "set up" with sufficient control information to walk through the loop with appropriate channel selection sequence. For example, when the scheduler and control unit 1030 issues the P1/BSA address to the first read channel RC1 unit 1005 (e.g., prior to time T1); the scheduler and control unit 1030 also sends a RC1-RC2-RC3-RC4 "queued package" of control signals to the first multiplexer control logic 1010.

Thus: 1) before the first word for the P1 packet is read from the read channel RC1 1005 at time T1, the first component of the package (e.g., the RC1 component) is issued to the first multiplexer 1005 by the multiplexer control logic 1010; 2) before the second word for the P1 packet is read from the read channel RC2 1006 at time T2, the second component of the package (e.g., the RC2 component) is issued to the first multiplexer 1005 by the multiplexer control logic 1010; 3) before the third word for the P1 packet is read from the read channel RC3 1007 at time T3, the third component of the package (e.g., the RC3 component) is issued to the first multiplexer 1005 by the multiplexer control logic 1010; and 4) before the fourth word for the P1 packet is read from the read channel RC4 1008 at time T4, the fourth component of the package (e.g., the RC4 component) is issued to the first multiplexer 1005 by the multiplexer control logic 1010.

Recall from the discussion of FIG. 7 that for each block to be written into the Input packet RAM 327 an error tag is written 706 into the error RAM 354 (e.g., at the block start address for the block) and the virtual lane of the packet to which the block belongs is written 707 into the virtual lane RAM 357 (e.g., again, at the block start address for the block). In an embodiment, after receiving (either from a grant from the arbiter or from the pointer RAM manager) the block start address of a block to be read, the scheduler and control unit 1030 uses the block start address to perform a read operation upon the error RAM 354 (e.g., via error RAM read channel 353, 1053) and the virtual lane RAM 357 (e.g., via virtual lane RAM read channel 356, 1056).

As such, for each block to be read from the Input packet RAM 327, the scheduler and control unit 1030 develops an understanding of: 1) whether or not the block is "clean" (i.e., contains no errors); and, 2) the particular virtual lane of the packet to which the block belongs. In response, if the block is not dean, the block can be flushed from the Input packet RAM rather than forwarded to the switching core; and, the virtual lane value can be submitted to the pointer RAM manager 341 (e.g., along the pointer RAM manager interface 361, 1061) so that the virtual lane's credit count can be refreshed (e.g., incremented) by an amount that reflects a block worth of data.

In a further embodiment, the grant from the arbiter not only includes an initial block start address for the packet to be released, but also includes a "grant count" that represents the number of times the packet is to be released from the Input packet RAM. In most cases, only one copy of the packet is forwarded to the switching core. As such, the grant count value may be configured to be understood as a "1". However, for connections that are multicasted (i.e., a connection having one source channel adapter node but multiple destination channel adapter nodes), the grant count will be a value that is understood to be greater than 1.

In an embodiment, the arbiter issues as many grants for the packet as the grant count indicates. Thus, as an example, if four copies of the packet are to be issued to the switching core, the arbiter issues four grants to the packet TX unit 323, 1023 wherein each of these four grants includes a grant count value of "4". Each of the four grants from the arbiter may be issued at any time. That is, for example, the arbiter may decide that one of the four output ports is not ready to handle the packet; and, may choose to delay the issuance of the grant until appropriate resources are available.

The grant count RAM 350 is organized to reflect how many copies of a packet have already been issued; the idea being that once all the necessary copies have been issued, the packet is deemed fully released. Specifically, for example, the addresses of the grant count RAM 350 are configured in one embodiment to mirror each of the block start addresses for the input port.

In this case, when a particular block address is used as the initial block start address for a packet, the same address in the grant count RAM 350 is continually updated (as described in more detail below) to reflect how many packets have been released (that have that particular initial block start address. As a result, the number of emissions for a multicast connection can be "kept track of". As an initial default value, the data fields at each grant count RAM 350 address may be made to store a value (e.g., "0") that indicates no packets have yet been sent (that start at its corresponding address).

As discussed, after receiving a grant from the arbiter that points out a particular initial block start address and grant count for a packet, the packet Tx unit 323, 1023 reads the initial block from the Input packet RAM as well as the remaining blocks that are link listed from it to form the packet. In an embodiment, during the reading of the packet, the packet Tx unit 323, 1023 is designed to simply ignore the grant count RAM 359 if the ground value in the grant from the arbiter indicates that only one packet is to be read from the Input packet RAM (i.e., the packet is not multicasted).

In a further embodiment, if the grant count value that is enclosed in the grant from the arbiter indicates that more than one packet is to be read from the Input packet RAM for that packet that the grant points to (i.e., the pointed to packet is multicasted), the packet Tx unit 323, 1023 is further designed to: 1) read the contents of the grant count RAM 359 at the initial block start address for the packet (e.g., via the grant count read/write interface 358, 1058); and 2) compare the value of the grant count read from the grant count RAM 359 against the grant count value that was enclosed in the grant from the arbiter.

In response, if the grant count value read from the grant count RAM 359 indicates that more packets (other than the one to be released with the present grant from the arbiter) are to be released (i.e., more grants are to be expected from the arbiter for this packet), the packet Tx unit 323, 1023 is designed to (e.g., simultaneous with the reading of the block from the VL input RAM): 1) increment the grant count value read from the grant count RAM 359 by "1"; and 2) re-write the updated grant count value back into the grant count RAM at the same initial block start address for the packet.

Thus, if the grant count value enclosed in the grant from the arbiter is "3" (indicating that three copies of the packet are to be forwarded to the switching core); the packet Tx unit 323, 1023 will read a value understood to be "0" (i.e., the default value) for the first grant received for the packet. As the value of "3" enclosed in the grant from the arbiter and the value of "0", read from the grant count RAM 359 indicate that more copies of the packet are to be issued after the present packet is forwarded to the switching core: 1) the value of "0" will be incremented to a value of "1"; and, 2) after the update, the value of "1" will be written back into the grant count RAM 359.

After the second grant for the packet is received (which will still enclose a grant count value of "3") a value of "1" will be read from the grant count RAM 359. As the value of "3" enclosed in the grant from the arbiter and the value of "1" read from the grant count RAM 359 indicate that more copies of the packet are to be issued after the present packet is forwarded to the switching core: 1) the value of "1" will be incremented to a value of "2"; and, 2) after the update, the value of "2" will be written back into the grant count RAM 359.

Then, after the third grant for the packet is received (which will still enclose a grant count value of "3") a value of "2" will be read from the grant count RAM 359. As the value of "3" enclosed in the grant from the arbiter and the value of "2" read from the grant count RAM 359 indicate that more copies of the packet will not be issued after the present packet is forwarded to the switching core; the packet Tx unit 323, 1023 will: 1) write a value understood to be "0" in the grant count RAM 359 at the initial block start address for the packet; and, 2) for each block of the packet, return the virtual lane value read from the virtual lane RAM 357 to the input policing unit (e.g., along credit refresh lane 351, 1051) so that the virtual lane's credit count can be refreshed (e.g., incremented) by an amount that reflects each block worth of data consumed by the packet. By waiting to perform the later process until the last packet of the multicast connection is released, the blocks of a multicasted packet are not deemed "free" until the last packet is released.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An input port to a switching core, comprising:
   a) an input policing unit that checks if a virtual lane has a sufficient number of credits to carry an input packet being received by said input policing unit;
   b) a request manager that generates a request for said packet to be switched by said switching core;
   c) a packet Rx unit that stores said packet into a memory by writing blocks of data into said memory;
   d) a packet Tx unit that receives a grant in response to said request and reads said packet from said memory in response to said grant by reading said blocks of data, wherein said grant may be received by said packet Tx unit before said packet is completely stored in said memory; and
   e) a pointer RAM manager that provides addresses of free blocks of data within said memory to said packet Rx unit and receives addresses of freed blocks of data within said memory from said packet Tx unit.

2. The input port of claim 1 wherein, if said packet is a packet that flows upon a virtual lane reserved for network information, said input policing unit does not check if a virtual lane has a sufficient number of credits.

3. The input port of claim 1 wherein said request further comprises information from said packet's header, said information comprising:
   1) a size of said packet;
   2) whether or not said packet is a packet that flows upon a virtual lane reserved for network information;
   3) a service level (SL) of said packet;
   4) a destination address of said packet; and
   5) a pointer that corresponds to an address for a first block of said blocks.

4. The input port of claim 1 wherein said request can be generated by said request manager before said packet is completely stored into said memory.

5. The input port of claim 1 wherein said packet Rx unit asks said request manager for one address for a free block within said memory for each one of said blocks of data that are written into said memory.

6. The input port of claim 1 wherein said input port further comprises a Pointer RAM, said Pointer RAM to store a link list of those address of said memory used to store said packet within said memory, said Pointer RAM also to store a link list of those addresses of said memory that are free blocks of data within said memory, both of said link lists maintained by said pointer RAM manager.

7. The input port of claim 1 wherein said memory further comprises a plurality of individual random access memories (RAMs) and said packet Tx unit further comprises a plurality of read channels, each one of said read channels to read from a different one of said memories, said plurality of read channels arranged in a serial loop with a control unit, said control unit to enter a read address into said loop so that a series of reads are made from each of said read channel units at said read address and to remove said read address from said loop after each of said read channels have performed their read with said read address.

8. The input port of claim 1 wherein, if said packet is to be multicasted, a unique grant is received by said packet Tx unit for each copy of said packet to be sent to said switching core, each unique grant having a first number, said first number indicating how many copies of said packet are to be sent to said switching core in order to fulfill said multicasting effort, said packet Tx unit coupled to a Grant RAM, said Grant RAM to maintain a second number that reflects how many copies of said packet have been sent to said switching core, said packet Tx unit configured to increment said second number if, after said increment, said second number is less than said first number.

9. The input port of claim 3 wherein said information further comprises which partition said packet belongs to if said packet belongs to a partition.

10. The input port of claim 4 wherein said request manager:
   1) generates said request in response to said packet being recognized as a packet that flows upon a virtual lane reserved for network information, or, if said packet is not recognized as a packet that flows upon a virtual lane reserved for network information;

2) generates said request in response to identifying a partition to which said packet belongs to if said request manager is told to check for partition information, or, if said request manager is not told to check for partition information;

3) generates said request in response to identifying a size of said packet.

11. The input port of claim 4 wherein if said grant is received by said packet Tx unit before said packet is completely stored into said memory, said packet Tx unit will begin to said read said packet from said memory before said packet is completely stored into said memory.

12. The input port of claim 5 wherein said memory further comprises a plurality of individual random access memories (RAMs), said packet Rx unit configured to utilize a block of data's corresponding address for a free block at each of said individual RAMs while writing said block into said memory.

13. The input port of claim 5 wherein said input port further comprises an Error RAM, said packet Rx unit configured to write to said Error RAM, for each block of data that is written into said memory, to indicate whether said block of data has an error.

14. The input port of claim 5 wherein said input port further comprises a Virtual Lane RAM, said packet configured to write to said Virtual Lane RAM, for each block of data from said packet that is written into said memory, to indicate said virtual lane that said packet traveled across.

15. The input port of claim 7 wherein said control loop receives, from said pointer manager, one read address to be entered into within said loop for each one of said blocks of data that are read from said memory.

16. The input port of claim 7 wherein said control unit can enter into said loop a second read address where data from a second packet is stored within said memory, said second read address within said loop while said read address is also within said loop so that data from said packet can be read from said memory via a first of said read channels while data from said second packet is being read from said memory via a second of said read channels.

17. The input port of claim 7 wherein said packet Tx unit further comprises a multiplexer, said multiplexer having an output that provides said packet to said switching core, said multiplexer having a different input for each of said read channels, each read channel output coupled to a different one of said multiplexer inputs, said multiplexer provided a series of channel select values over time that cause said multiplexer to select the output of whichever read channel has said read address so as to synchronize said multiplexer's input selection with said read address's travels through said loop.

18. The input port of claim 12 wherein said packet Rx unit is configured to increment said corresponding address to produce a second address that is utilized at each of said individual RAMs while writing said block into said memory.

19. The input port of claim 18 wherein said packet Rx unit is configured to increment said second address to produce a third address that is utilized at each of said individual RAMs while writing said block into said memory.

20. The input port of claim 19 wherein said packet Rx unit is configured to increment said third address to produce a fourth address that is utilized at each of said individual RAMs while writing said block into said memory.

21. The input port of claim 16 wherein said packet Tx unit further comprises four read channels and said control unit can enter up to three different read address within said loop so that data from three different packets can be simultaneously read from said memory.

22. The input port of claim 17 herein said control unit can enter into said loop a second read address where data from a second packet is stored within said memory, said second read address within said loop while said read address is also within said loop so that data from said packet can be read from said memory via a first of said read channels while data from said second packet is being read from said memory via a second of said read channels.

23. The input port of claim 20 wherein said plurality of individual RAMs further comprises four individual RAMs.

24. The input port of claim 22 wherein said packet Tx unit further comprises a second multiplexer, said second multiplexer having an output that provides said second packet to said switching core, said second multiplexer having a different input for each of said read channels, each read channel output coupled to a different one of said second multiplexer inputs, said second multiplexer provided a series of channel select value over time that cause said second multiplexer to select the output of whichever read channel has said second read address so as to synchronize said second multiplexer's input selection with said second read address's travels through said loop.

25. A switch, comprising:
  a) a switching core that switches a packet;
  b) an arbiter that receives a request to switch said packet through said switch;
  c) an input port that receives said packet, said input port coupled to both said switching core and said arbiter, said input port further comprising:
    1) a request manager that generates said request;
    2) a packet Rx unit that stores said packet into a memory by writing blocks of data into said memory;
    3) a packet Tx unit that receives a grant from said arbiter in response to said request and reads said packet from said memory in response to said grant by reading said blocks of data; and
    4) a pointer RAM manager that provides addresses for free blocks of data within said memory to said packet Rx unit and receives addresses of freed blocks of data within said memory from said packet Tx unit; and
  d) an output port that receives said packet from said switching core.

26. The input port of claim 25 wherein, if said packet is a packet that flows upon a virtual lane reserved for network information, an input policing unit within said input port does not check if a virtual lane has a sufficient number of credits.

27. The input port of claim 25 wherein said request further comprises information from said packet's header, said information comprising:
  1) a size of said packet;
  2) whether or not said packet is a packet that flows upon a virtual lane reserved for network information;
  3) a service level (SL) of said packet;
  4) a destination address of said packet; and
  5) a pointer that corresponds to an address for a first block of said blocks.

28. The input port of claim 25 wherein said request can be generated by said request manager before said packet is completely stored into said memory.

29. The input port of claim 25 wherein said packet Rx unit asks said request manager for one address for a free block within said memory for each one of said blocks of data that are written into said memory.

30. The input port of claim 25 wherein said input port further comprises a Pointer RAM, said Pointer RAM to store a link list of those address of said memory used to store said packet within said memory, said Pointer RAM also to store a link list of those addresses of said memory that are free blocks of data within said memory, both of said link lists maintained by said pointer RAM manager.

31. The input port of claim 25 wherein said memory further comprises a plurality of individual random access memories (RAMs) and said packet Tx unit further comprises a plurality of read channels, each one of said read channels to read from a different one of said memories, said plurality of read channels arranged in a serial loop with a control unit, said control unit to enter a read address into said loop so that a series of reads are made from each of said read channel units at said read address and to remove said read address from said loop after each of said read channels have performed their read with said read address.

32. The input port of claim 25 wherein, if said packet is to be multicasted, a unique grant is received by said packet Tx unit for each copy of said packet to be sent to said switching core, each unique grant having a first number, said first number indicating how many copies of said packet are to be sent to said switching core in order to fulfill said multicasting effort, said packet Tx unit coupled to a Grant RAM, said Grant RAM to maintain a second number that reflects how many copies of said packet have been sent to said switching core, said packet Tx unit configured to increment said second number if, after said increment, said second number is less than said first number.

33. The input port of claim 27 wherein said information further comprises which partition said packet belongs to if said packet belongs to a partition.

34. The input port of claim 28 wherein said request manager:
   1) generates said request in response to said packet being recognized as a packet that flows upon a virtual lane reserved for network information, or, if said packet is not recognized as a packet that flows upon a virtual lane reserved for network information;
   2) generates said request in response to identifying a partition to which said packet belongs to if said request manager is told to check for partition information, or, if said request manager is not told to check for partition information;
   3) generates said request in response to identifying a size of said packet.

35. The input port of claim 28 wherein said grant may be received by said packet Tx unit before said packet is completely stored into said memory and, as a consequence, said packet Tx unit will begin to said read said packet from said memory before said packet is completely stored into said memory.

36. The input port of claim 29 wherein said memory further comprises a plurality of individual random access memories (RAMs), said packet Rx unit configured to utilize a block of data's corresponding address for a free block at each of said individual RAMs while writing said block into said memory.

37. The input port of claim 31 wherein said control loop receives, from said pointer manager, one read address to be entered into within said loop for each one of said blocks of data that are read from said memory.

38. The input port of claim 31 wherein said control unit can enter into said loop a second read address where data from a second packet is stored within said memory, said second read address within said loop while said read address is also within said loop so that data from said packet can be read from said memory via a first of said read channels while data from said second packet is being read from said memory via a second of said read channels.

39. The input port of claim 31 wherein said packet Tx unit further comprises a multiplexer, said multiplexer having an output that provides said packet to said switching core, said multiplexer having a different input for each of said read channels, each read channel output coupled to a different one of said multiplexer inputs, said multiplexer provided a series of channel select values over time that cause said multiplexer to select the output of whichever read channel has said read address so as to synchronize said multiplexer's input selection with said read address's travels through said loop.

40. The input port of claim 36 wherein said packet Rx unit is configured to increment said corresponding address to produce a second address that is utilized at each of said individual RAMs while writing said block into said memory.

41. The input port of claim 29 wherein said input port further comprises an Error RAM, said packet Rx unit configured to write to said Error RAM, for each block of data that is written into said memory, to indicate whether said block of data has an error.

42. The input port of claim 29 wherein said input port further comprises a Virtual Lane RAM, said packet configured to write to said Virtual Lane RAM, for each block of data from said packet that is written into said memory, to indicate said virtual lane that said packet traveled across.

43. The input port of claim 38 wherein said packet Tx unit further comprises four read channels and said control unit can enter up to three different read address within said loop so that data from three different packets can be simultaneously read from said memory.

44. The input port of claim 39 wherein said control unit can enter into said loop a second read address where data from a second packet is stored within said memory, said second read address within said loop while said read address is also within said loop so that data from said packet can be read from said memory via a first of said read channels while data from said second packet is being read from said memory via a second of said read channels.

45. The input port of claim 40 wherein said packet Rx unit is configured to increment said second address to produce a third address that is utilized at each of said individual RAMs while writing said block into said memory.

46. The input port of claim 44 wherein said packet Tx unit further comprises a second multiplexer, said second multiplexer having an output that provides said second packet to said switching core, said second multiplexer having a different input for each of said read channels, each read channel output coupled to a different one of said second multiplexer inputs, said second multiplexer provided a series of channel select values over time that cause said second multiplexer to select the output of whichever read channel has said second read address so as to synchronize said second multiplexer's input selection with said second read address's travels through said loop.

47. The input port of claim 45 wherein said packet Rx unit is configured to increment said third address to produce a fourth address that is utilized at each of said individual RAMs while writing said block into said memory.

48. The input port of claim 47 wherein said plurality of individual RAMs further comprises four individual RAMs.

49. A method, comprising:
checking if a virtual lane has a sufficient number of credits to carry a packet that is being received;
generating a request for said packet to be switched by a switching core;
storing said packet into a memory by writing blocks of data into said memory, said writing making use of addresses for free blocks of data within said memory;
receiving a grant in response to said request; and
reading said packet from said memory, in response to said grant, by reading said blocks of data, said writing freeing blocks of data within said memory, wherein said grant may be received before said packet is completely stored in said memory.

50. The method of claim 32 wherein, if said packet is a packet that flows upon a virtual lane reserved for network information, checking if a virtual lane has a sufficient number of credits is not performed.

51. The method of claim 32 wherein said request further comprises information from said packet's header, said information comprising:
1) a size of said packet;
2) whether or not said packet is a packet that flows upon a virtual lane reserved for network information;
3) a service level (SL) of said packet;
4) a destination address of said packet; and
5) a pointer that corresponds to an address for a first block of said blocks.

52. The method of claim 49 further comprising generating said request before said request is completely stored into said memory.

53. The method of claim 49 further comprising asking for one address for a free block within said memory for each one of said blocks of data that are written into said memory.

54. The method of claim 49 further comprising generating a link list of those addresses of said memory used to store said packet within said memory.

55. The method of claim 49 wherein said memory further comprises a plurality of individual random access memories (RAMs) said reading further comprising circulating a read address through a series of read channels, each one of said read channels to read from a different one of said memories, so that a series of reads are made from each of said read channel units at said read address.

56. The method of claim 49 wherein, if said packet is to be multicasted, a unique grant is received for each copy of said packet to be sent to said switching core, each unique grant having a first number, said first number indicating how many copies of said packet are to be sent to said switching core in order to fulfill said multicasting effort, said method further comprising maintaining a second number that reflects how many copies of said packet have been sent to said switching core, said method further comprising incrementing said second number if, after said increment, said second number is less than said first number.

57. The method of claim 51 wherein said information further comprises which partition said packet belongs to if said packet belongs to a partition.

58. The method of claim 53 wherein said memory further comprises a plurality of individual random access memories (RAMs), said method further comprising utilizing a block of data's corresponding address for a free block at each of said individual RAMs while writing said block into said memory.

59. The method of claim 53 further comprising writing to an Error RAM, for each block of data that is written into said memory, to indicate whether said block of data has an error.

60. The method of claim 53 further comprising writing to a Virtual Lane RAM, for each block of data from said packet that is written into said memory, to indicate said virtual lane that said packet traveled across.

61. The method of claim 55 further comprising entering one requested read address into a loop that is at least partially formed by said series of read channels for each one of said blocks of data that are read from said memory.

62. The method of claim 55 further comprising circulating a second read address where data from a second packet is stored within said memory, said second read address being circulated while said read address is being circulated so that data from said packet can be read from said memory via a first of said read channels while data from said second packet is being read from said memory via a second of said read channels.

63. The method of claim 55 further comprising multiplexing each read channel output to a first input of said switching core while said read address is said circulating so that said packet is sent to said switching core through said first input.

64. The method of claim 52 further comprising:
1) generating said request in response to said packet being recognized as a packet that flows upon a virtual lane reserved for network information, or, if said packet is not recognized as a packet that flows upon a virtual lane reserved for network information;
2) generating said request in response to identifying a partition to which said packet belongs to if a partition checking feature is activated, or, if said partition checking feature is not activated;
3) generating said request in response to identifying a size of said packet.

65. The method of claim 58 further comprising incrementing said corresponding address to produce a second address that is utilized at each of said individual RAMs while writing said block into said memory.

66. The method of claim 62 further comprising circulating three different read addresses so that data from three different packets can be simultaneously read from said memory.

67. The method of claim 63 further comprising circulating a second read address where data from a second packet is stored within said memory, said second read address being circulated while said read address is being circulated so that data from said packet can be read from said memory via a first of said read channels while data from said second packet is being read from said memory via a second of, said read channels.

68. The method of claim 65 further comprising incrementing said second address to produce a third address that is utilized at each of said individual RAMs while writing said block into said memory.

69. The method of claim 64 further comprising receiving said grant before said packet is completely stored into said memory and, as a consequence, beginning to said read said packet from said memory before said packet is completely stored into said memory.

70. The method of claim 67 further comprising multiplexing each read channel output to a second input of said switching core while said second read address is said circulating so that said second packet is sent to said switching core through said second input.

71. The method of claim 68 further comprising incrementing said third address to produce a fourth address that is utilized at each of said individual RAMs while writing said block into said memory.

72. The method of claim 71 herein said plurality of individual RAMs further comprises four individual RAMs.

73. An apparatus, comprising:
- means for checking if a virtual lane has a sufficient number of credits to carry a packet that is being received;
- means for generating a request for said packet to be switched by a switching core;
- means for storing said packet into a memory by writing blocks of data into said memory, said writing making use of addresses for free blocks of data within said memory;
- means for receiving a grant in response to said request; and
- means for reading said packet from said memory, in response to said grant, by reading said blocks of data, said writing freeing blocks of data within said memory, wherein said grant may be received before said packet is completely stored in said memory.

74. The apparatus of claim 73 wherein said request further comprises information from said packet's header, said information comprising:
1) a size of said packet;
2) whether or not said packet is a packet that flows upon a virtual lane reserved for network information;
3) a service level (SL) of said packet;
4) a destination address of said packet; and
5) a pointer that corresponds to an address for a first block of said blocks.

75. The apparatus of claim 73 further comprising means for generating said request before said request is completely stored into said memory.

76. The apparatus of claim 73 further comprising means for asking for one address for a free block within said memory for each one of said blocks of data that are written into said memory.

77. The apparatus of claim 73 further comprising generating a link list of those addresses of said memory used to store said packet within said memory.

78. The apparatus of claim 73 wherein said memory further comprises a plurality of individual random access memories (RAMs), said means for reading further comprising means for circulating a read address through a series of read channels, each one of said read channels to read from a different one of said memories, so that a series of reads are made from each of said read channel units at said read address.

79. The apparatus of claim 74 further comprising means for receiving said grant before said packet is completely stored into said memory and means for beginning to said read said packet from said memory before said packet is completely stored into said memory as a consequence.

80. The apparatus of claim 75 wherein said means for generating said request before said request is completely stored into said memory further comprises means for:
1) generating said request in response to said packet being recognized as a packet that flows upon a virtual lane reserved for network information, or, if said packet is not recognized as packet that flows upon a virtual lane reserved for network information;
2) generating said request in response to identifying a partition to which said packet belongs to if a partition checking feature is activated, or, if said partition checking feature is not activated;
3) generating said request in response to identifying a size of said packet.

81. The apparatus of claim 76 wherein said memory further comprises a plurality of individual random access memories (RAMs), said apparatus further comprising means for utilizing a block of data's corresponding address for a free block at each of said individual RAMs while writing said block into said memory.

\* \* \* \* \*